United States Patent
Shukla et al.

(10) Patent No.: US 10,979,885 B1
(45) Date of Patent: Apr. 13, 2021

(54) NEIGHBOR DISCOVERY AND CHANNEL COORDINATION OF DYNAMIC FREQUENCY SELECTION (DFS) MESH NETWORKS

(71) Applicant: Amazon Technologies, Inc., Seattle, WA (US)

(72) Inventors: Ashish Kumar Shukla, Milpitas, CA (US); Kun Ting Tsai, Fremont, CA (US); Karim Abulmakarem Mohamed Khalil, Santa Clara, CA (US); Burak Varan, Cupertino, CA (US); Lori Yoshida, Sunnyvale, CA (US); Kiran Kumar Edara, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/422,786

(22) Filed: May 24, 2019

(51) Int. Cl.
  *H04W 8/00* (2009.01)
  *H04W 84/18* (2009.01)
  (Continued)

(52) U.S. Cl.
  CPC ........... *H04W 8/005* (2013.01); *H04L 5/0032* (2013.01); *H04W 40/246* (2013.01);
  (Continued)

(58) Field of Classification Search
  CPC .............. H04W 8/005; H04W 40/246; H04W 72/0453; H04W 74/0808; H04W 84/18;
  (Continued)

(56) References Cited

U.S. PATENT DOCUMENTS 10,129,731 B2  11/2018  Yoshida et al.
10,219,142 B2   2/2019  Yoshida et al.
(Continued)

FOREIGN PATENT DOCUMENTS

WO  2011063182 A1  5/2011
WO  2015138914 A1  9/2015

OTHER PUBLICATIONS

IEEE Std 802.11-2016 IEEE Standard for Information Technology—Local and Metropolitan Area Networks—Specific Requirements Part 11: Wireless LAN MAC and PHY Specifications, 12.5.4 Broadcast/multicast integrity protocol (BIP), Nov. 2016.
(Continued)

*Primary Examiner* — Chi H Pham
*Assistant Examiner* — Ji-Hae Yea
(74) *Attorney, Agent, or Firm* — Lowenstein Sandler LLP

(57) ABSTRACT

Network hardware devices organized in a wireless mesh network (WMN). A first mesh network device performs a three-stage discovery protocol; in a first stage, a discovery scan uses a first radio to find a set of neighbor devices in proximity; in a second stage, a discovery locate probe process is performed on a secondary discovery channel that is from a same frequency band group as a first DFS channel; in a third stage, a CAC is performed via the first DFS channel and, after the CAC, a neighbor peering request is sent and a neighbor peering response is received from a second mesh network device via a second radio. The neighbor peering response confirms establishment of a first communication channel between the second radio of the first mesh network device and a radio of the second mesh network device over the first DFS channel.

20 Claims, 17 Drawing Sheets

(51) Int. Cl.
*H04W 40/24* (2009.01)
*H04W 72/04* (2009.01)
*H04W 74/08* (2009.01)
*H04L 5/00* (2006.01)

(52) U.S. Cl.
CPC ... *H04W 72/0453* (2013.01); *H04W 74/0808* (2013.01); *H04W 84/18* (2013.01)

(58) Field of Classification Search
CPC ..... H04W 74/08; H04W 24/02; H04W 16/14; H04W 40/244; H04W 36/18; H04W 24/08; H04W 84/12; H04W 72/04; H04W 40/24; H04W 88/12; H04L 5/0032; H04L 12/18; H04L 5/0062; H04L 5/00
See application file for complete search history.

(56) References Cited

U.S. PATENT DOCUMENTS

| | | |
|---|---|---|
| 2006/0215624 A1 | 9/2006 | Adya et al. |
| 2009/0129323 A1 | 5/2009 | Chen et al. |
| 2010/0150077 A1 | 6/2010 | Nanda et al. |
| 2011/0199918 A1 | 8/2011 | Sampath et al. |
| 2013/0176960 A1 | 7/2013 | Franklin et al. |
| 2015/0223088 A1 | 8/2015 | Niu et al. |
| 2017/0048728 A1* | 2/2017 | Ngo ............ H04W 76/15 |
| 2017/0079001 A1 | 3/2017 | Lewis |
| 2017/0086211 A1 | 3/2017 | Sahin et al. |
| 2017/0366956 A1* | 12/2017 | Yoshida ............ H04W 72/005 |

OTHER PUBLICATIONS

IEEE Std 802.11-2016 IEEE Standard for Information Technology—Local and Metropolitan Area Networks—Specific Requirements Part 11: Wireless LAN MAC and PHY Specifications, 11.3.4 Authentication and deauthentication, Nov. 2016.

IEEE Std 802.11-2016 IEEE Standard for Information Technology—Local and Metropolitan Area Networks—Specific Requirements Part 11: Wireless LAN MAC and PHY Specifications, 11.13 Group addressed robust management frame procedures, Nov. 2016.

International Search Report and Written Opinion dated Aug. 3, 2017, on application No. PCT/US2017/033662.

Das SM, Pucha H, Koutsonikolas D, Hu YC, Peroulis D. DMesh: incorporating practical directional antennas in multichannel wireless mesh networks. IEEE Journal on selected areas in communications. Nov. 2006;24(11):2028-39.

Choudhury RR, Vaidya NH. Performance of ad hoc routing using directional antennas. Ad Hoc Networks. Mar. 31, 2005;3(2):157-73.

International Search Report and Written Opinion dated Jul. 20, 2018, on application No. PCT/US2018/031407.

* cited by examiner

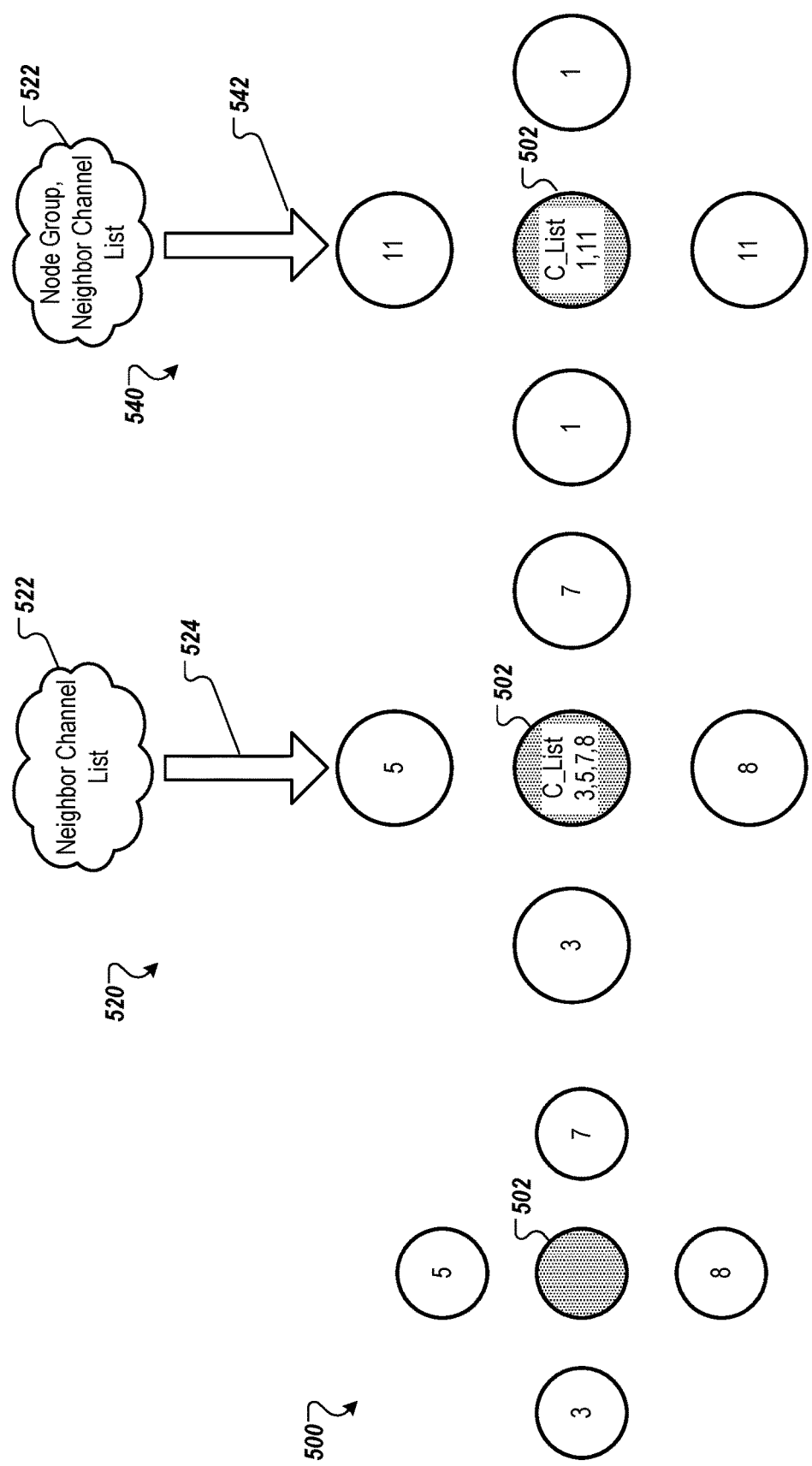

NEIGHBOR DISCOVERY AND CHANNEL COORDINATION OF DYNAMIC FREQUENCY SELECTION (DFS) MESH NETWORKS

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5A illustrates an uncoordinated discovery scan according to one embodiment.

FIG. 5B illustrates a targeted discovery scan according to one embodiment.

FIG. 5C illustrates a coordinated and targeted discovery scan according to one embodiment.

DETAILED DESCRIPTION

Figure 1:
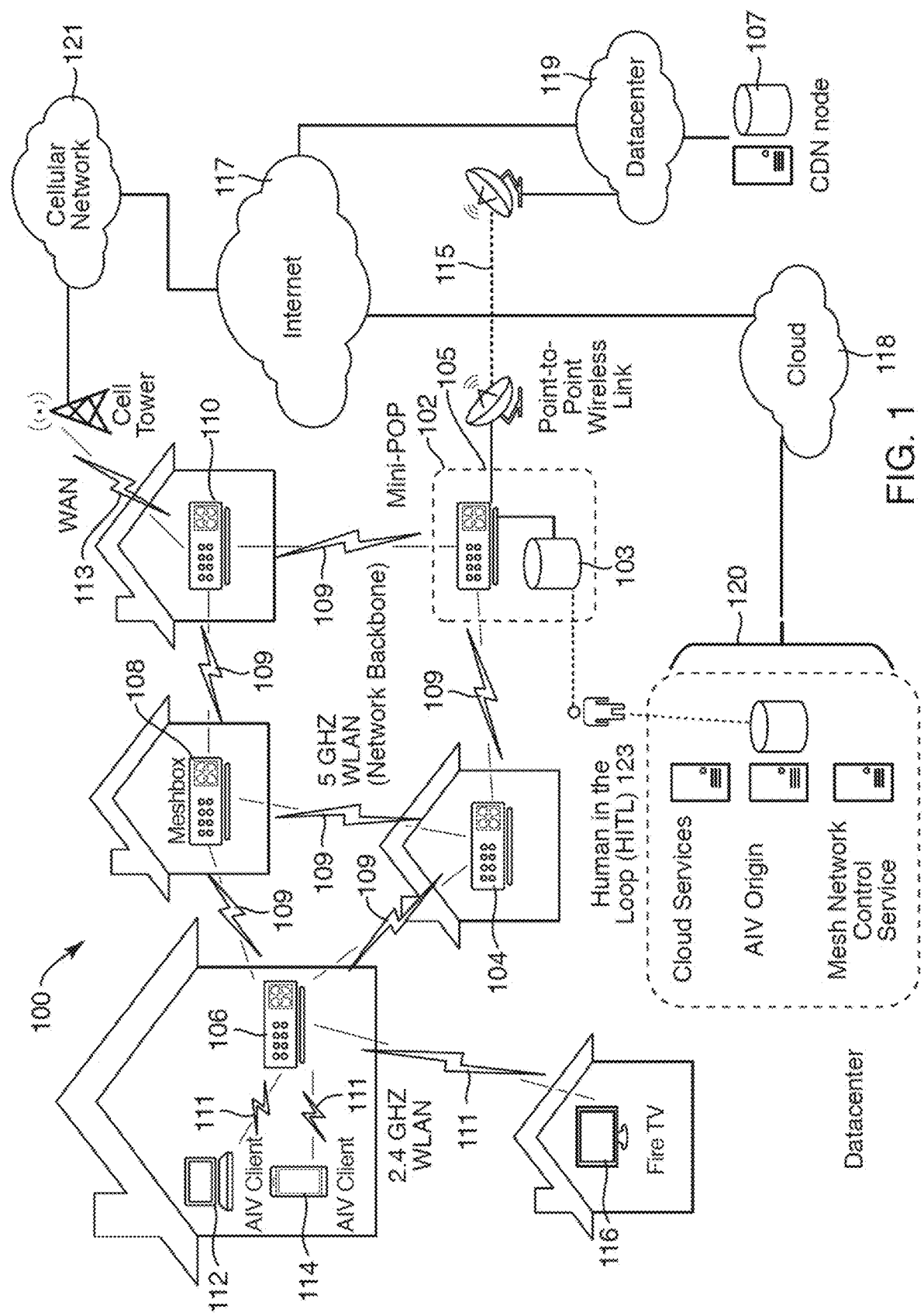
FIG. 1 is a network diagram of network hardware devices organized in a wireless mesh network (WMN) for content distribution to client devices in an environment of limited connectivity to broadband Internet infrastructure according to one embodiment.

Technologies directed to neighbor discovery and channel coordination of a dynamic frequency selection (DFS) mesh network using a three-stage discovery protocol are described. DFS requires a primary device to be in Channel Available Check (CAC), which is a silent period of 60 seconds before the primary device can transmit on a DFS channel. This restriction makes Neighbor Discovery and Neighbor Selection challenging for DFS channels since each discovery is now delayed by 60 seconds. There are 15 DFS channels, so the total time for a single mesh node to discover a single mesh peer on DFS channel can be over 15 minutes. Moreover, during the CAC period, the neighbor devices would not respond to probe requests from the mesh node; thus causing the discovery to fail.

Aspects of the present disclosure address the above and other deficiencies by using a three-stage discovery protocol in the Neighbor Discovery and Channel Coordination of DFS Mesh Network. The three-stage discovery protocol can reduce discovery time and ensure reliable peering. The 3-tier discovery protocol can include: (1) a 2.4 GHz Omni-directional scan, (2) a 5 GHz peer-assessment discovery, and (3) coordinated DFS peering as described herein more detail below. The discovery process and channel selection can be guided by a server (e.g., a cloud or other controller) to achieve optimal discovery time and least disruption to the mesh network.

Also, aspects of the present disclosure address the above and other deficiencies by using a peer-assessment discovery channel associated with a DFS channel. The peer-assessment discovery channel, also referred to herein as a secondary discovery channel, is a non-DFS channel that is selected from a same frequency band group as the DFS channel to mimic signal propagation characteristics, attenuation factors, and output power of the first DFS channel. Aspects of the present disclosure of Neighbor Discovery and Channel Coordination of DFS Mesh Network can address the Neighbor Discovery on DFS channel problem and also addresses the radar event propagation.

A wireless mesh network (WMN) containing multiple mesh network devices, organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations.

Network hardware devices organized in a WMN. A first mesh network device performs a three-stage discovery protocol; in a first stage, a discovery scan uses a first radio to find a set of neighbor devices in physical proximity (or connection proximity) to the first mesh network device; in a second stage, a discovery locate probe process is performed on a secondary discovery channel that is from a same frequency band group as a first DFS channel; in a third stage, a CAC is performed via the first DFS channel and, after the CAC, a neighbor peering request is sent to a second mesh network device via a second radio, the neighbor peering request including an intent (e.g., intent data) to establish a first communication channel between the second radio of the first mesh network device and a radio of the second mesh network device over the first DFS channel. In response, a neighbor peering response is received from the second mesh network device via the second radio. The neighbor peering response includes data that accepts the confirms an establishment of the first communication channel between the second radio of the first mesh network device and the radio of the second mesh network device over the first DFS channel.

One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multimedia content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard content distribution network (CDN), but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIGS. 1-4A are generally directed to network hardware devices, organized in a wireless mesh network, for content distribution to client consumption devices in environments of limited connectivity to broadband internet infrastructure. The embodiments described herein may be deployed in these network hardware devices. FIG. 4B-14 are generally directed to neighbor discovery, neighbor selection, and neighbor replacement for mesh network devices in the WMN for routing traffic on a network backbone of the WMN.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The network hardware devices 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, when line of sight is required for the directional microwave link, terrain or building may be constraints on the line of sight. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices.

These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
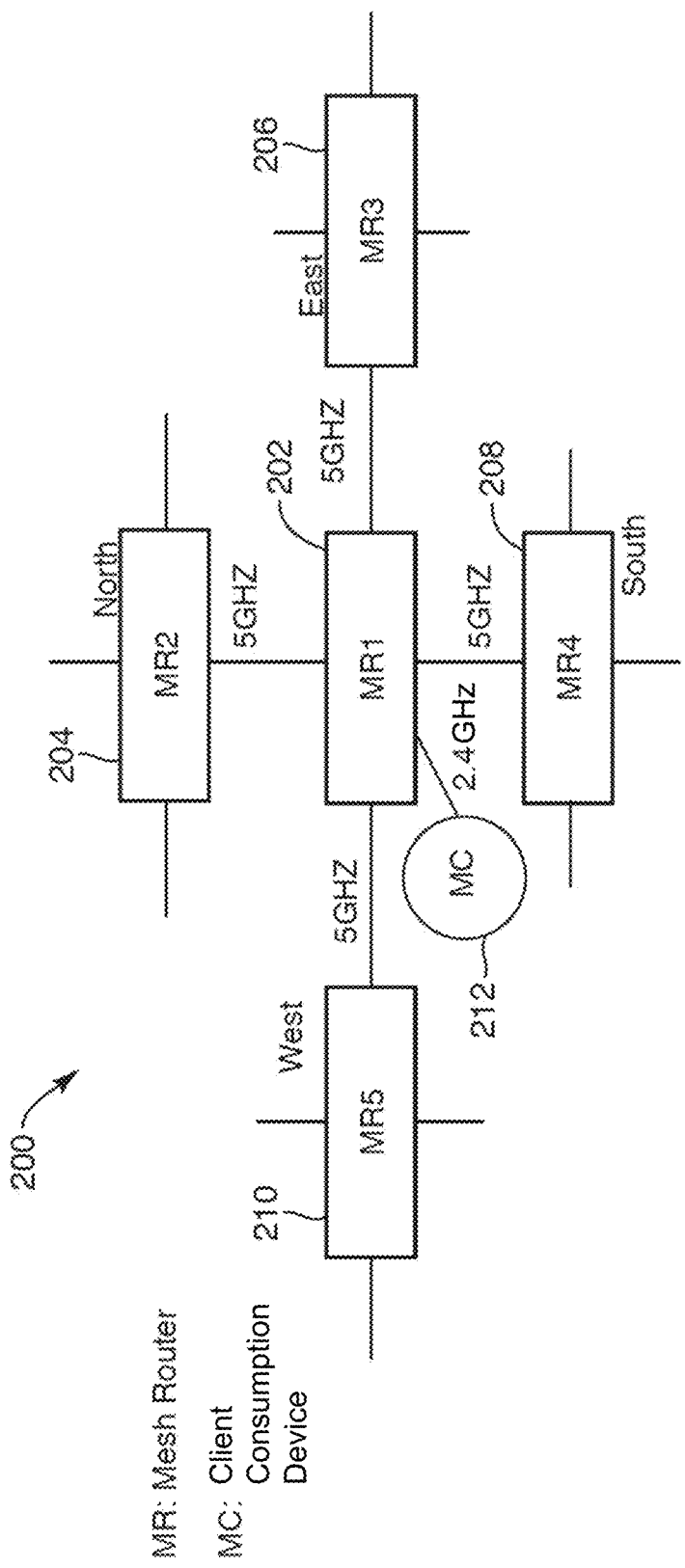
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations that north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3:
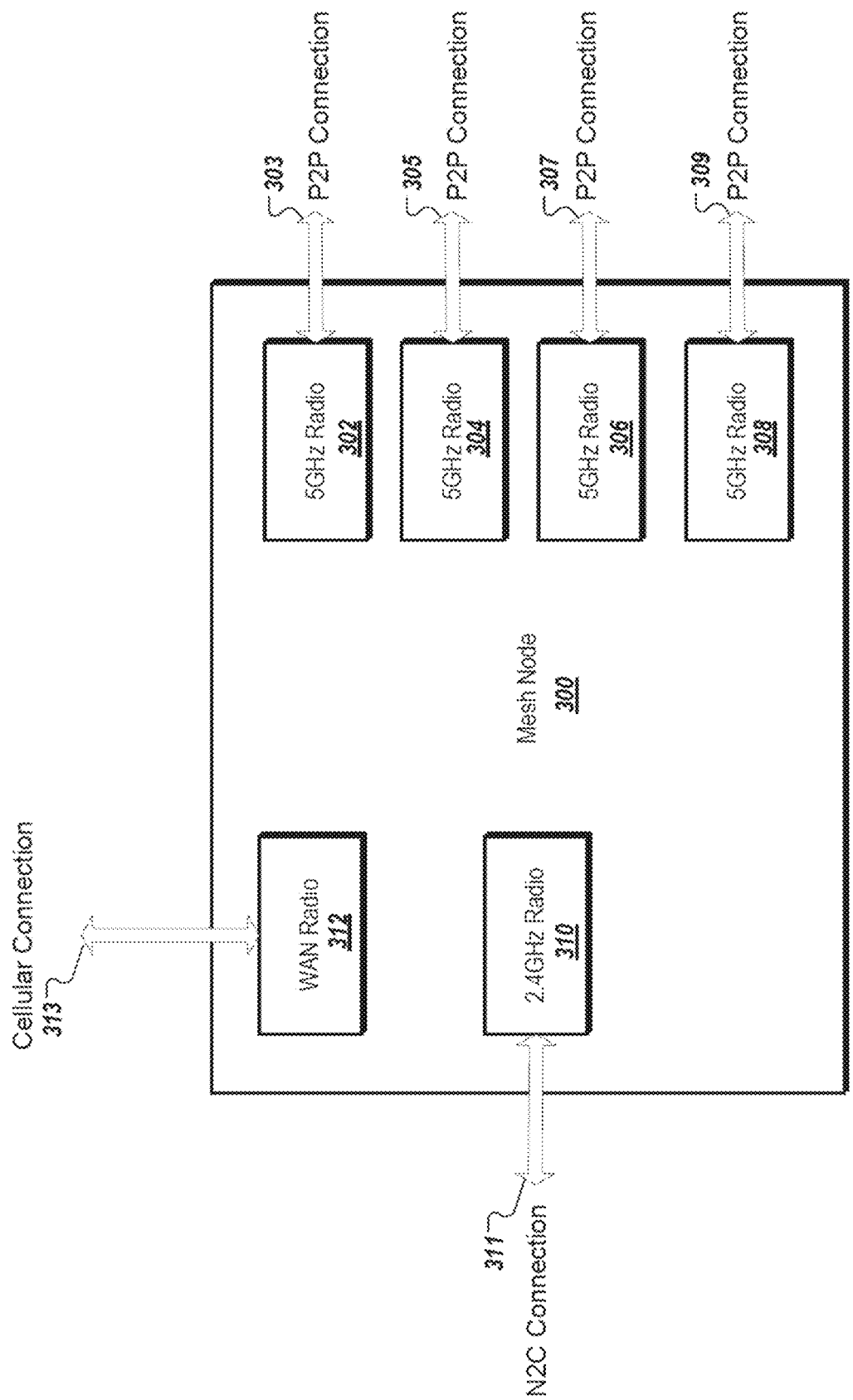
FIG. 3 is a block diagram of a mesh node with multiple radios according to one embodiment.

FIG. 3 is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to the MNCS by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN.

In a further embodiment, the first network hardware device receive the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP node, as described herein. When the mini-POP node does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory or in persistent storage of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP node is coupled to a storage device to store the content files as original content files for the wireless mesh network. A point-to-point wireless link may be established between the mini-POP node and a node of a CDN. In another embodiment, the mini-POP node is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receive the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP) node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and the MNSC.

In another embodiment, a system includes a POP node having access to content files via at least one of data storage coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

Figure 4A:
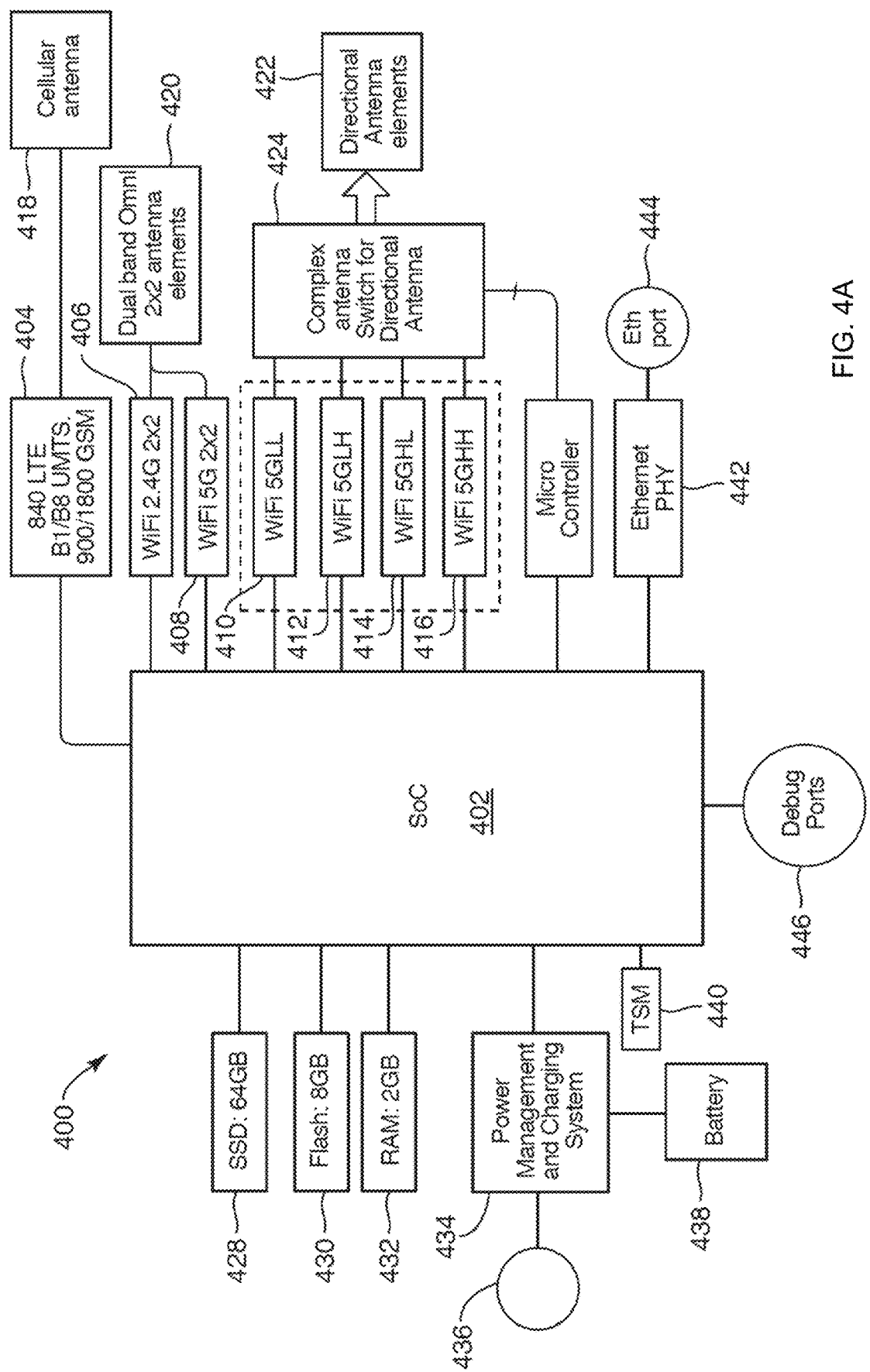
FIG. 4A is a block diagram of a mesh network device according to one embodiment.

FIG. 4A is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. The mesh network device 400 may be the mini-POP node 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 400, such as for 10 minutes before the system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 404 may support other bands, as well as other cellular technologies. The mesh network device 400 may include a GPS antenna and corresponding GPS module to track the location of the mesh network device 400, such as moves between homes. However, the mesh network device 400 is intended to be located inside a structure, the GPS antenna and module may not be used in some embodiments.

The mesh network device 400 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be four sector directional antennas (e.g., four antennas) for 5 GHz. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422.

In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first 2×2 2.4 GHz MIMO radio and a 2×2 5 GHz MIMO radio. The second set of WLAN modules includes a first 2×2 5 GHz MIMO radio ("5GLL"), a second 2×2 5 GHz MIMO radio ("5GLH"), a third 2×2 5 GHz MIMO radio ("5GHL"), and a fourth 2×2 5 GHz MIMO radio ("5GHH"). The dual-band omnidirectional antennas 420 may include a first omnidirectional antenna and a second omnidirectional antenna (not individually illustrated in FIG. 4A). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna). In one embodiment, four directional antennas may be coupled to one radio each with two additional directional antennas selectively couple-able to the four radios.

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

In one embodiment, the antenna switching circuitry 424 includes multiple diplexers and switches to connect different combinations of antennas to the multiple radios. For example, the antenna switching circuitry 424 can switch between configurations of the following antennas:

ANT Hx→Horizontal orientation device side antenna
ANT Vx→Vertical orientation device side antenna
ANT VB→Vertical orientation device bottom side antenna
ANT HB→Horizontal orientation device bottom side antenna
ANT VU→Vertical orientation device top side antenna
ANT HU→Horizontal orientation device top side antenna
ANT0→Omni directional antenna
ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

FIG. 4B-14 are generally directed to Neighbor Discovery and Channel Coordination of DFS Mesh Network for mesh network devices in the WMN for routing traffic on a network backbone of the WMN.

Figure 4B:
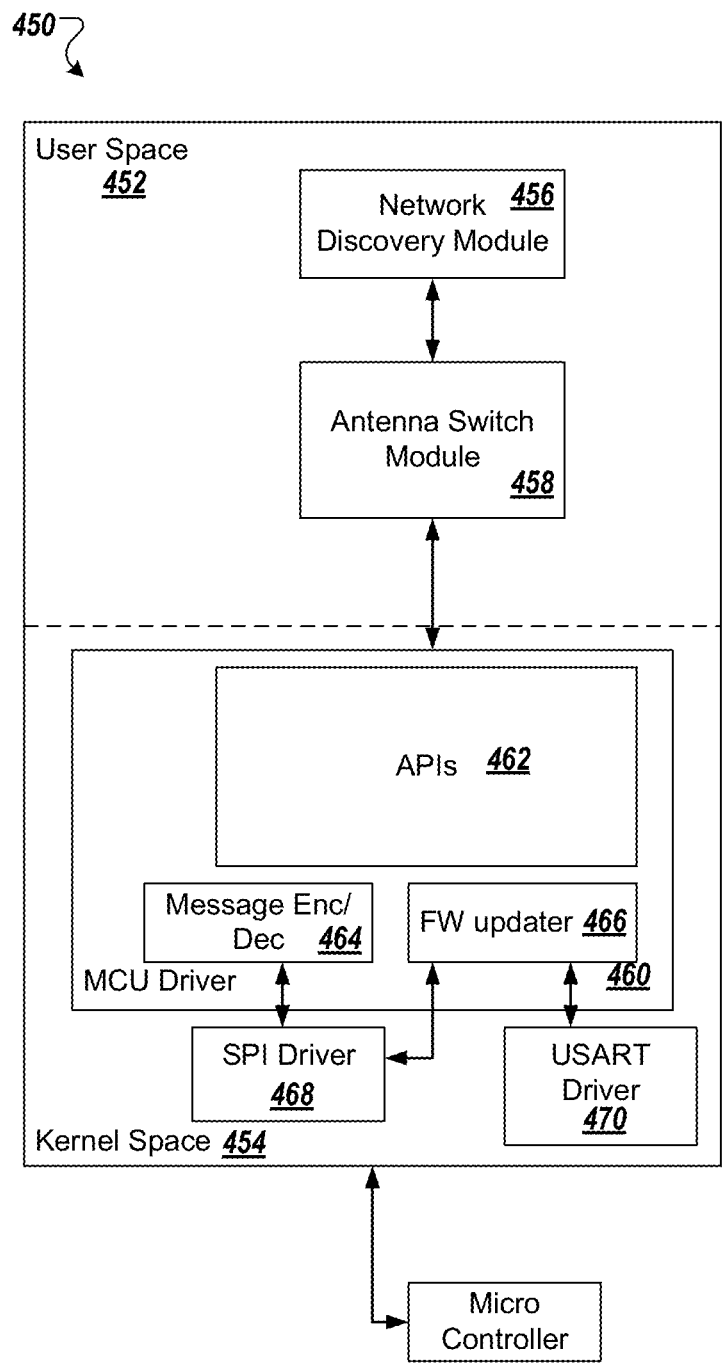
FIG. 4B is a block diagram of an application processor in which a network discovery module may be implemented according to one embodiment.

FIG. 4B is a block diagram of an application processor in which a network discovery module 456 may be implemented according to one embodiment. The application processor 450 executes an operating system that segregates memory (virtual memory) into user space 452 and kernel space 454. In this embodiment, the network discovery module 456 and antenna switching module 458 execute in the user space 452. The network discovery module 456 may be instructions that when executed by the application processor 450 perform various operations as described below with respect to FIGS. 13-14. The network discovery module 456 can instruct the antenna switch module 458 to control one or more radios to communicate with other mesh network devices in connection with a neighbor discovery process, a neighbor selection process, a neighbor replacement process, or any similar process. The network discovery module 456 can instruct the antenna switch module 458 to control one or more radios to communicate with other mesh network devices in connection with a neighbor discovery and channel coordination of a DFS mesh network as described herein. Once the mesh network devices in the mesh network are discovered and selected, the application processor 450 can communicate with other neighbor mesh network devices to route data traffic on a network backbone of multiple P2P wireless connections between the mesh network devices. In other embodiments, some of the entire network discovery module 456 can be implemented in the kernel space.

In the kernel space 454, a micro controller unit (MCU) driver 460 can execute. The MCU driver 460 may include multiple application programming interfaces (APIs) 462 to interface to other components, such as the radios and micro controller, as described herein. The APIs 462 can communicate messages to other components and may use a message encoder/decoder 464 to encode and decode these messages. The APIs 462 may include an API for getting firmware versions, an API for updating the firmware, and an API for getting radio information (e.g., radio configuration, antenna configuration, channel information, chamber/sector information, or the like. The MCU driver 460 may also include a firmware (FW) updater 466. Also, in the kernel space 454, a serial packet interface (SPI) driver 468 and a Universal Synchronous/Asynchronous Receiver/Transmitter (USART) driver 470.

In one embodiment, there is an interface mechanism between the user space 452 and kernel space 454 that has minimum latency. For example, in cases when there is an invalid configuration being input by an application, such as the antenna switch module 458, the error should be reported as quickly as possible to the application. The application processor 450 may also include power management modules in the user space 452 or in the kernel space 454 since the application processor 450 could be operating in a battery-backed operating state during power outages.

In one embodiment, the SPI driver 468 can be used for messaging between the application processor 450 and the micro controller and the USART driver 470 can be used for firmware updates. The application processor 450 can use general purpose input-output (GPIO) interrupts to drive antenna switching. The switching could even be done on a per-packet basis. The application processor 450 can store any configuration, such as GPIO configurations in non-volatile memory.

The following description is directed to neighbor discovery and channel coordination of a DFS mesh network with an example of a mesh network device having four radios with antennas in 6 sectors; four horizontal sectors and two vertical sectors. For example, when a mesh network device boots up, the mesh network device needs to find its neighbor mesh network devices. The mesh network device scans omni-directionally over 2.4 GHz for access point (AP) beacon frames that contain an information element (IE, ID, etc.) that identifies a mesh network device, such as having a specific vendor identifier. In one embodiment, beacon frames are continually (e.g., at a defined interval) broadcast from mesh network devices. A separate ID (multiple separate IDs) corresponding to multiple mesh network devices may be identified and stored. The mesh network device determines where each of those neighbors is located and therefore which of its directional antennas may be used to reach each neighbor through a process called neighbor discovery. As described herein, the network discovery scan can be uncoordinated discovery scans, targeted discovery scans, or coordinated and targeted discovery scans. Once neighbors are found and located through the neighbor discovery process, neighbor mesh network devices are chosen via a neighbor selection process. The initial selection may be done locally. In one embodiment, an optimized selection using the MNCS as described herein that can take a full network perspective of the WMN to globally select neighbors for any one of the mesh network devices in the WMN. Once neighbors are selected by the neighbor selection process, the mesh network device can store the radio configuration for routing data traffic to neighboring mesh network devices. In one embodiment, after neighbor mesh network devices are selected, the mesh network device can begin mesh peering and authentication.

For description of the neighbor discovery process, four 5 GHz radios are used with directional antennas as shown in FIGS. 5A-5C. For this example, multiple neighbors are allowed per radio and each of four 5 GHz radios with directional antennas can connect to one antenna at a time. Alternatively, in other embodiments, a single neighbor may be allowed per radio. It should be noted that the four radios, as described herein, may be referred to as directional radios or 5 GHZ directional radios, since these antennas are each coupled to a directional antenna in one of the sectors.

As described above, the three-stage discovery protocol of the Neighbor Discovery and Channel Coordination of DFS Mesh Network, can include: (1) a 2.4 GHz Omni-directional scan, (2) a 5 GHz peer-assessment discovery, and (3) coordinated DFS peering as described herein more detail below. The discovery process and channel selection can be guided by a server (e.g., a cloud or other controller) to achieve optimal discovery time and least disruption to the mesh network.

For the first stage (1), the initial state of the discovery utilizes the 2.4 GHz Omni-directional antenna to scan for neighbor devices in proximity. The neighbor devices can be in physical proximity or connection proximity to the first mesh network device. The neighbor devices can be considered in physical or connection proximity to the first mesh network device when the radios of the first mesh network device and the neighbor device can receive communications from one another or can establish a wireless connection. That is, the neighbor device can be considered in proximity when the neighbor device is within range of a radio of the first mesh network device. The discovery scan can be an uncoordinated discovery scan, a targeted discovery scan, or a coordinated and targeted discovery scan as described below.

FIG. 5A illustrates an uncoordinated discovery scan 500 according to one embodiment. The 2.4 GHz Omni-directional antenna allows the scanning node to find all neighbors in proximity in all directions. Because the node does not know its neighbor's channels, the scanning node must scan all channels. In this case, the total number of channels scanned can be 11 channels. In particular, a scanning node 502 (a first mesh network device) performs the discovery scan 500, in a first stage of the three-stage discovery protocol, using the first radio to find a set of channels (channels 3, 5, 7, and 8) of the neighbor devices in proximity to the scanning node 502.

FIG. 5B illustrates a targeted discovery scan 520 according to one embodiment. In this embodiment, instead of scanning all channels, a server 522 can send a neighbor channel list 524 (C_List) in order to perform a targeted discovery scan 520. The 2.4 GHz scan time is optimized by the cloud through propagating the neighbor channel list (C_List) to the scanning node in order to perform targeted scans. In particular, the scanning node 502 receives, from the server 522, the neighbor channel list 524 before performing the discovery scan. The neighbor channel list 524 identifies a subset of channels (channels 3, 5, 7, and 8) that can be used to connect to each of the set of neighbor devices in proximity to the scanning node 502. The server 522 can already know, for example, that one neighbor device can communicate on channel 3, another neighbor device can communicate on channel 5, and so forth. The server 522 can already know the subset of channels from prior configurations of the set of neighbor devices. The neighbor channel list 524 limits the discovery scan 520 to the subset of channels as the targeted discovery scan 520. The scanning node 502, with the neighbor channel list 524, performs the targeted discovery scan 520 in the first stage using the first radio to find the subset of channels of the set of neighbor devices in proximity to the scanning node 502. Because the scanning node 502 has the neighbor channel list, the scanning node 502 doesn't have to scan all channels. In this case, the total number of channels scanned can be 4 channels.

FIG. 5C illustrates a coordinated and targeted discovery scan 540 according to one embodiment. The server 522 can also cluster nodes into groups according to their geographical location and historical congestion data in order to reduce the number of distinct channels to speed up the scan. Node clustering and neighbor channel list reduces both the scan and service interruption time. In particular, the scanning node 502 receives, from the server 522, a grouped neighbor channel list 542 before performing the discovery scan 520. The grouped neighbor channel list 542 identifies a subset of channels (channels 1 and 11) of the set of neighbor devices that are clustered by the server 522 in a group and in proximity to the scanning node 502. The grouped neighbor channel list 542 limits the discovery scan 520 to the subset of channels as the coordinated and targeted discovery scan 540. The scanning node 502, with the grouped neighbor channel list 542, performs the coordinated and targeted discovery scan 540 in the first stage using the first radio to find the subset of channels of the set of neighbor devices that are clustered by the server 522 in the group and in proximity to the scanning node 502. Because the scanning node 502 has the grouped neighbor channel list, the scanning node 502 doesn't have to scan all channels. In this case, the total number of channels scanned can be 2 channels.

In other embodiments, the discovery scan of the first stage can be done through out-of-band radios, such as using a second radio technology (e.g., the Zigbee®, Bluetooth, or cellular technologies in parallel to operations of the WLAN radios. Performing the discovery scan through the out-of-band radio can speed up the discovery scan process.

For the second stage (2) of the three-stage discovery protocol, the mesh network device uses a peer-assessment discovery channel associated with a DFS channel. As described above, the peer-assessment discovery channel, also referred to herein as a secondary discovery channel, is a non-DFS channel that is selected from a same frequency band group as the DFS channel to mimic signal propagation characteristics, attenuation factors, and output power of the first DFS channel. The purpose of the Peer-assessment Discovery using the peer-assessment discovery channel is to overcome the CAC limitation of performing a discovery locate probe process on DFS channels themselves. The Peer-assessment Discovery channel is a non-DFS channel that is selected on the same frequency band group as the DFS channel (low band or high band group) in order to mimic the DFS channel's signal propagation characteristics, attenuation factors (walls, concrete floor, metal mesh) and output power. The discovery locate probe process is then performed via the Peer-assessment Discovery Channel to derive the most optimal radio/antenna sector for each neighbor as an intermediate transition state before the final peering via the DFS channel in the third stage of the three-stage protocol.

Figure 6:
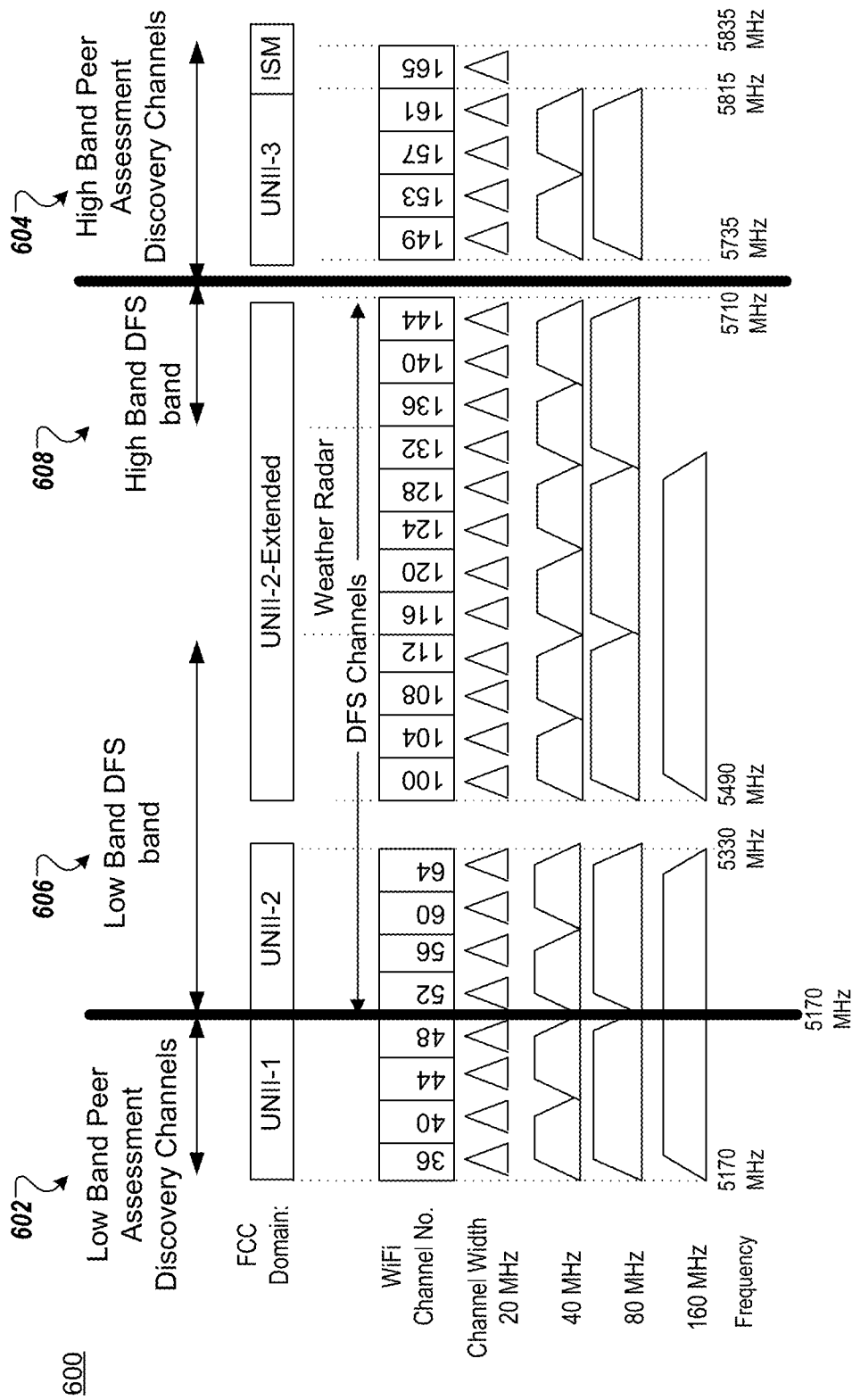
FIG. 6 is a graph that illustrates channel allocation by radios under a wireless local area network (WLAN) protocol and Peer-Assessment Discovery Channels according to an embodiment.

FIG. 6 is a graph 600 that illustrates channel allocation by radios under a wireless local area network (WLAN) protocol and Peer-Assessment Discovery Channels 602 and 604 according to an embodiment. Across the top of the graph 600 are various UNII bands, which fall into Federal Communication Commission (FCC) regulated domains. The UNII-2 and UNII-2-Extended domains include DFS channels and overlapping channels for weather radar. Below the domain identifications are WiFi® channels, and below the WiFi® channels are illustrated potential communication link bandwidths that would subsume the above-identified WiFi® channels. For example, each discrete WiFi® channel spans over 20 MHz, and so any adjacent pair of channels spans 40 MHz, any series of four channels spans 80 MHz, and any series of eight channels spans 160 MHz.

Although a radio may operate on one primary channel (such as CH 100 for example), a radio can operate on a wider channel bandwidth such as over a 40, 80, or 160 MHz. Radar detection, however, may occur most frequently on the primary 20 MHz channel. For example, consider bandwidth 80 MHz with primary channel 52 and secondary channels 56, 60, and 64 (each 20 MHz wide). An interference event present on the secondary channels 56, 60, and 64 may not be reported unless the communication link bandwidth is reduced to 20 MHz for detection purposes. A communication link in this case may be defined to operate on a channel and bandwidth that has one or more 20 MHz channels as a "DFS radar channel."

Recognizing the fact that a DFS radar channel may be considered to include multiple secondary channels, two channel bandwidths may be defined for the communication link, namely an operating channel bandwidth and a communication link bandwidth. In various embodiments, the operating channel bandwidth is fixed at a maximum channel bandwidth allowed by the WLAN protocol for receiving data within the first primary channel and multiple secondary channels between two devices (e.g., two mesh network device devices or between a client wireless device and a mesh network device). According to complementary embodiments, the communication link bandwidth is set to a first frequency range and is adjustable by the radio to be identical to or lower than the operating channel bandwidth.

In one embodiment, the operating channel bandwidth of the communication link is channel 80 MHz with primary channel 52, whereas the communication link bandwidth could be 20 MHz. In this case, the radios in the communication link perform 20 MHz frame exchange; however, the radios can still receive on the entire 80 MHz frequency band. The communication link bandwidth, however, could be expanded to include additional 20 MHz bands within the 80 MHz frequency band.

As described above, the peer-assessment discovery channel is a non-DFS channel that is selected from a same frequency band group as the DFS channel. In particular, a first peer-assessment discovery channel can be selected from a low band group of peer-assessment discovery channels 602 corresponding to a low band DFS band 606. The channels in the low band group of peer-assessment discovery channels 602 can have similar signal propagation characteristics, attenuation factors, and output power as the channels in the low band DFS band 606. A second peer-assessment discovery channel can be selected from a high band group of peer-assessment discovery channels 604 corresponding to a high band DFS band 608. The channels in the high band group of peer-assessment discovery channels 604 can have similar signal propagation characteristics, attenuation factors, and output power as the channels in the high band DFS band 608. For each band group, the Peer-assessment Discovery Channel can be selected by a remote server in order to minimize interference and avoid congestion and minimize interference, such as illustrated in FIG. 7.

Figure 7:
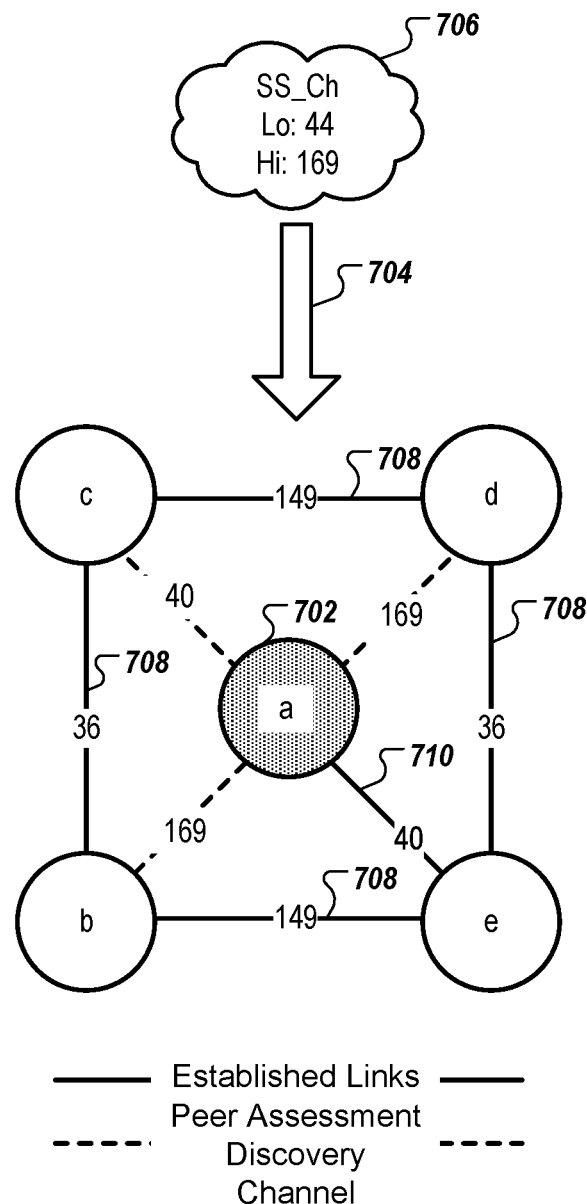
FIG. 7 illustrates a mesh network device that uses a peer-assessment discovery channel list from a server according to one embodiment.

FIG. 7 illustrates a mesh network device 702 that uses a peer-assessment discovery channel list 704 from a server 706 according to one embodiment. In this example, the mesh network device 702 can use the peer-assessment discovery channel list 704 from the server 706 to avoid interfering with the already established links 708 between neighbor mesh network devices (illustrated as the solid lines between neighbor mesh network devices b, c, d, and e) and any established links (e.g., established link 710) between the mesh network device 702 and the neighbor mesh network devices (illustrated as the solid line between mesh network device a and the neighbor mesh network device e). For example, the peer-assessment discovery channel list 704 can identify a low peer-assessment discovery channel (e.g., channel 44) and a high peer-assessment discovery channel (e.g., channel 169) for the second stage of the three-stage discovery protocol. In the second stage, the mesh network device 702 performs a discovery locate probe process on one or more of the peer-assessment discovery channels in the peer-assessment discovery channel list 704 from the server 706. For example, a first peer-assessment discovery channel (e.g., channel 44) is non-DFS channel that is selected from a same frequency band group as a selected first DFS channel (e.g., one of the low band DFS channels). The non-DFS channel is used during the second stage to mimic signal propagation characteristics, attenuation factors, and output power of the first DFS channel. A second peer-assessment discovery channel (e.g., channel 169) is a second non-DFS channel that is selected from a different frequency band group as a selected second DFS channel. The second non-DFS channel is used during the second stage to mimic signal propagation characteristics, attenuation factors, and output power of the second DFS channel.

After the peer-assessment discovery of the second stage is completed, the mesh network device can perform a peering process on a DFS channel in a third stage of the of the three-stage discovery protocol. The DFS channel corresponds to the peer-assessment discovery channel used during the second stage.

On the DFS channels during the third stage, radar events could happen at any time during the peering process. Thus, a coordinated peering process can be used to ensure the integrity of the post peering topology, such as illustrated in FIG. 8.

Figure 8:
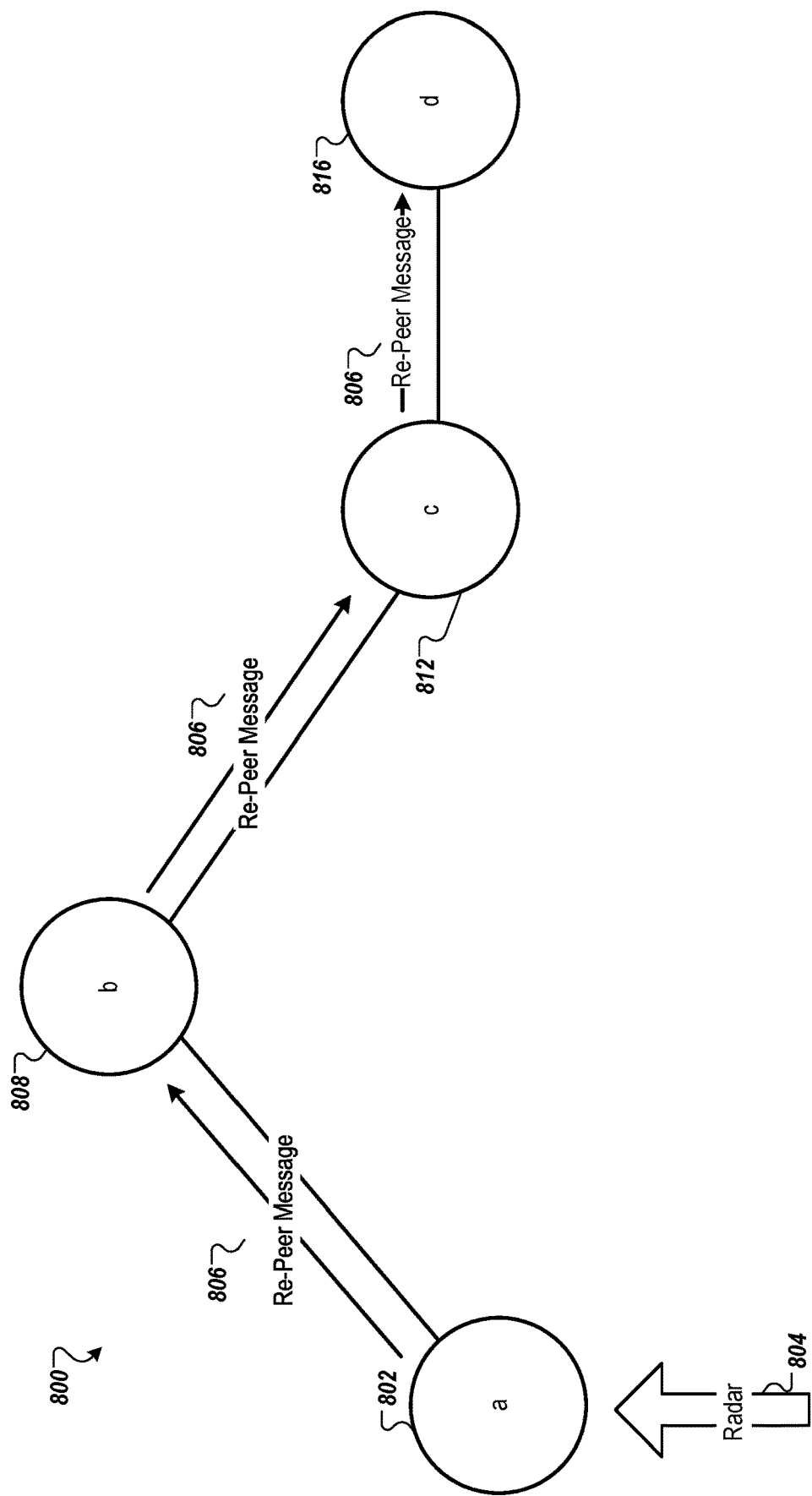
FIG. 8 is a diagram illustrating an example of a peering process of a DFS channel in which a radar event occurs according to one embodiment.

FIG. 8 is a diagram illustrating an example of a peering process 800 of a DFS channel in which a radar event occurs according to one embodiment. During the peering process 800 of the DFS channel, a mesh network device 802 and its neighbor mesh network devices performs a CAC on the DFS channel. If a radar event 804 occurs during the CAC, the mesh network device 802 vacates the DFS channel and moves to a coordinated fallback channel. The coordinated fallback channel is known to the mesh network devices in the network and is a non-DFS channel. The mesh network device 802 also transmits a Radar Event Re-Peer Message 806 through the 2.4 GHz Omni-directional antenna to its peers. Any peer receiving the Radar Event Re-Peer Message 806, first checks whether Radar is also locally detected at the respective peer. If the peer receiving the Radar Event Re-Peer Message did not detect Radar, the peer responds with the neighbor that transmitted the Radar Event Re-Peer Message 806 on the fallback channel. The peer receiving the Radar Event Re-Peer Message (e.g., mesh network device 808) will also relay the Radar Event Re-Peer Message 806 to its peers who are part of the same mesh network. A peer node receiving the Radar Event Re-Peer Message 806 and itself is already on the fallback channel will drop the message if the message has already been previously received; otherwise, it will relay the message to its peers. The Re-Peer messages 806 are transmitted over 2.4 GHz Omni-directional antenna using unicast action frames with four retries, for example. The Re-Peer message propagation ensures that all peers whose radio is participating in the mesh group will receive the message and re-peers on the fallback channel.

In some embodiment, the coordinated fallback channel is determined by a server (not illustrated in FIG. 8). The server can determine the coordinated fallback channel based on historical congestion and interference data within the wireless mesh network.

Figure 9:
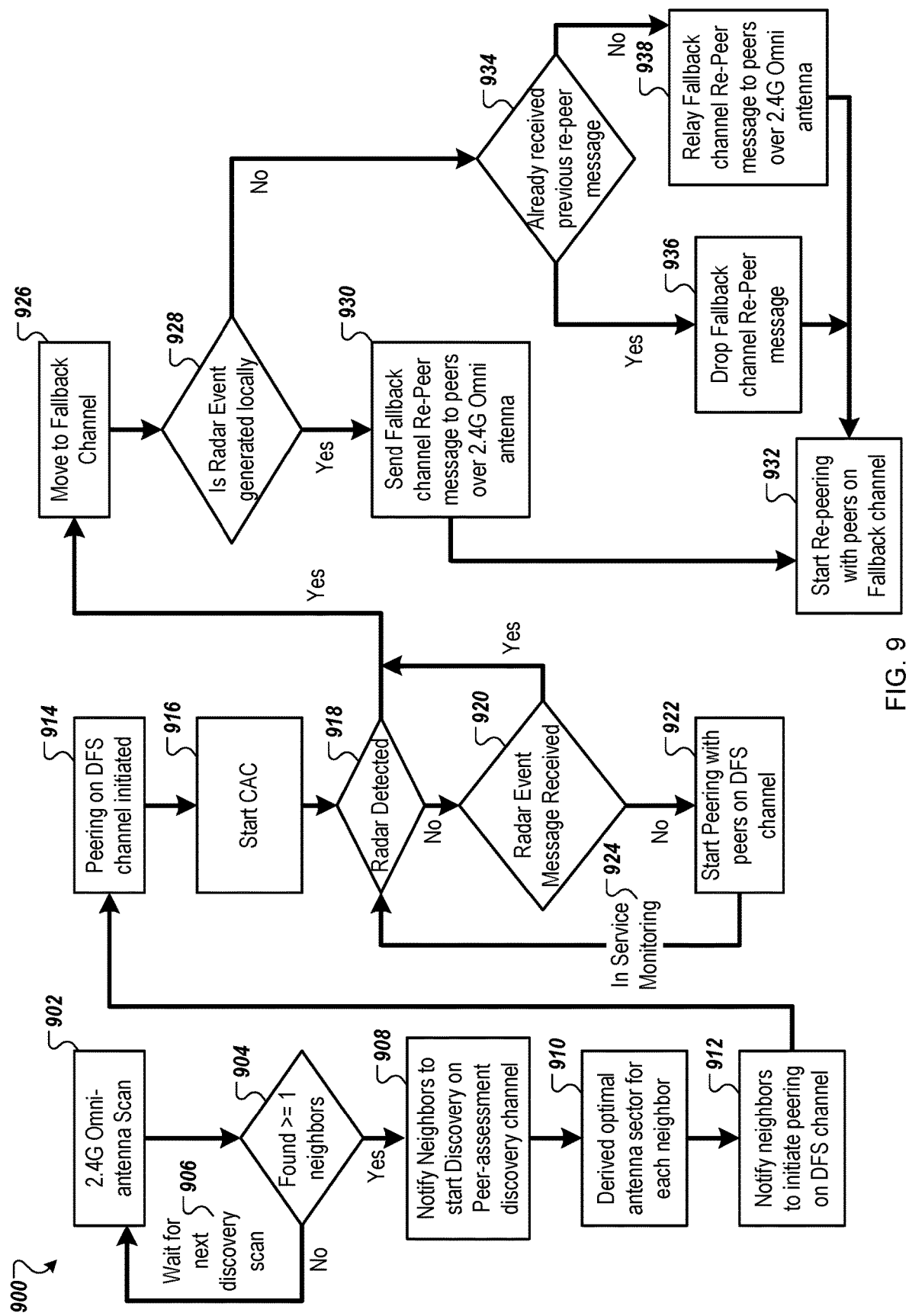
FIG. 9 is a flow diagram illustrating a three-stage discovery process for neighbor discovery and channel coordination according to one embodiment.

FIG. 9 is a flow diagram illustrating a three-stage discovery process 900 for neighbor discovery and channel coordination according to one embodiment. The three-stage discovery process 900 may be performed by processing logic that comprises hardware (e.g., circuitry, dedicated logic, programmable logic, microcode, etc.), software, firmware, or a combination thereof. In one embodiment, the three-stage discovery process 900 may be performed by any of the mesh network devices described herein and illustrated with respect to FIGS. 1-8.

Referring to FIG. 9, the three-stage discovery process 900 begins by the processing performing a 2.4 GHz omni-directional antenna discovery scan (block 902). At block 904, the processing logic determines if more than one neighbor mesh network device is found as a result of the 2.4 GHz omni-directional antenna discovery scan at block 902. If no neighbor mesh network devices are found at block 904, the processing logic waits 906 for the next discovery scan and returns to block 902 to perform another 2.4 GHz omni-directional antenna discovery scan.

When one or more neighbor mesh network devices are found at block 904, the processing logic notifies the neighbor mesh network devices to start discovery on a peer-assessment discovery channel (block 908). The processing logic can determine an optimal antenna sector for each neighbor mesh network device (block 910) and notify the neighbor mesh network device to initiate peering on a DFS channel that corresponds to the peer-assessment discovery channel specified at block 908 (block 912). The processing logic initiates peering on the DFS channel (block 914) and starts a CAC on the DFS channel (block 916). After the CAC at block 916, the processing logic determines whether a radar event is detected (block 918). If a radar event is not detected at block 918, the processing logic determines if a radar event message is received at block 920. If no radar event message is received at block 920, the processing logic starts peering with the neighbor mesh network device (peer) on the DFS channel (block 922). The processing logic can perform in-service monitoring at block 926 and return to block 918.

If a radar event is detected at block 918 or the radar message was received at block 920, the processing logic moves to a fallback channel (block 926). The processing logic determines if the radar event is generated locally. If so, the processing logic sends on the fallback channel a re-peer message to peers over the 2.4 GHz omni-directional antenna and starts re-peering with peers on the fallback channel (block 932). If the radar event is not generated locally, as determined at block 928, the processing logic determines whether it has received previous re-peer messages (block 934). If previous re-peer messages have been received at block 934, the processing logic drops the re-peer messages on the fallback channel (block 936, and starts re-peering with peers on the fallback channel at block 932. If there have been no re-peer messages previously received at block 934, the processing logic relays the re-peer message on the fallback channel to peers over the 2.4 GHz omni-directional antenna (block 938) and starts re-peering with peers on the fallback channel at block 932.

The three-stage discovery process 900 for neighbor discovery and channel coordination of DFS Mesh Network can utilize the cloud historic data and monitoring engine to recover lost channels due to radar events. For example, a server (e.g., cloud server or other remote controller) can monitor and track daily activities of individual links in a cluster and schedule channel recovery during link idle periods. The server can schedule the channel recovery CAC when the link is expected to be idle for more than 2×CAC periods, for example. To do so, each mesh network device can upload its link activities to the server and the server tracks and computes the idle periods for each link, such as illustrated in FIG. 10.

Figure 10:
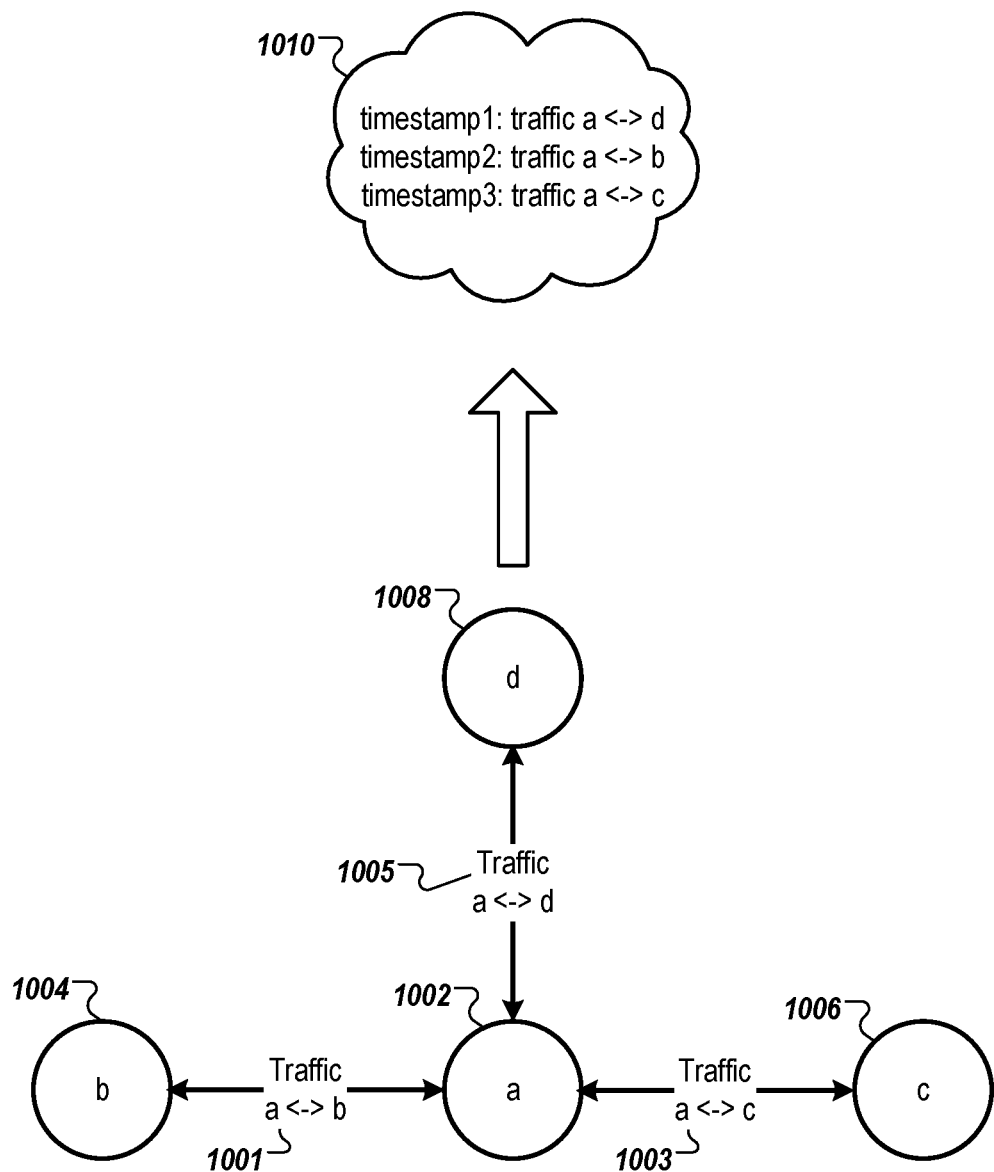
FIG. 10 illustrates a mesh network device that communicates with three neighbor mesh network devices and reports link activity to a server according to one embodiment.

FIG. 10 illustrates a mesh network device 1002 that communicates with three neighbor mesh network devices 1004, 1006, 1008 and reports link activity to a server 1010 according to one embodiment. As illustrated, the mesh network device 1002 can store historical data of each of its links with neighbor mesh network device. For example, the historical data can include traffic data 1001 between the mesh network device 1002 and the mesh network device 1004 (labeled traffic a<->b), traffic data 1003 between the mesh network device 1002 and the mesh network device 1006 (labeled traffic a<->c), and traffic data 1005 between the mesh network device 1002 and the mesh network device 1008 (labeled traffic a<->d). The mesh network device 1002 can report the historical data, including traffic data 1001, 1003, 1005, to the server 1010. The server 1010 can track and compute the idle periods for each link of the mesh network device. As a result, the server 1010 can schedule a channel recovery process during the idle periods to avoid service interruption, such as illustrated in FIG. 11.

Figure 11:
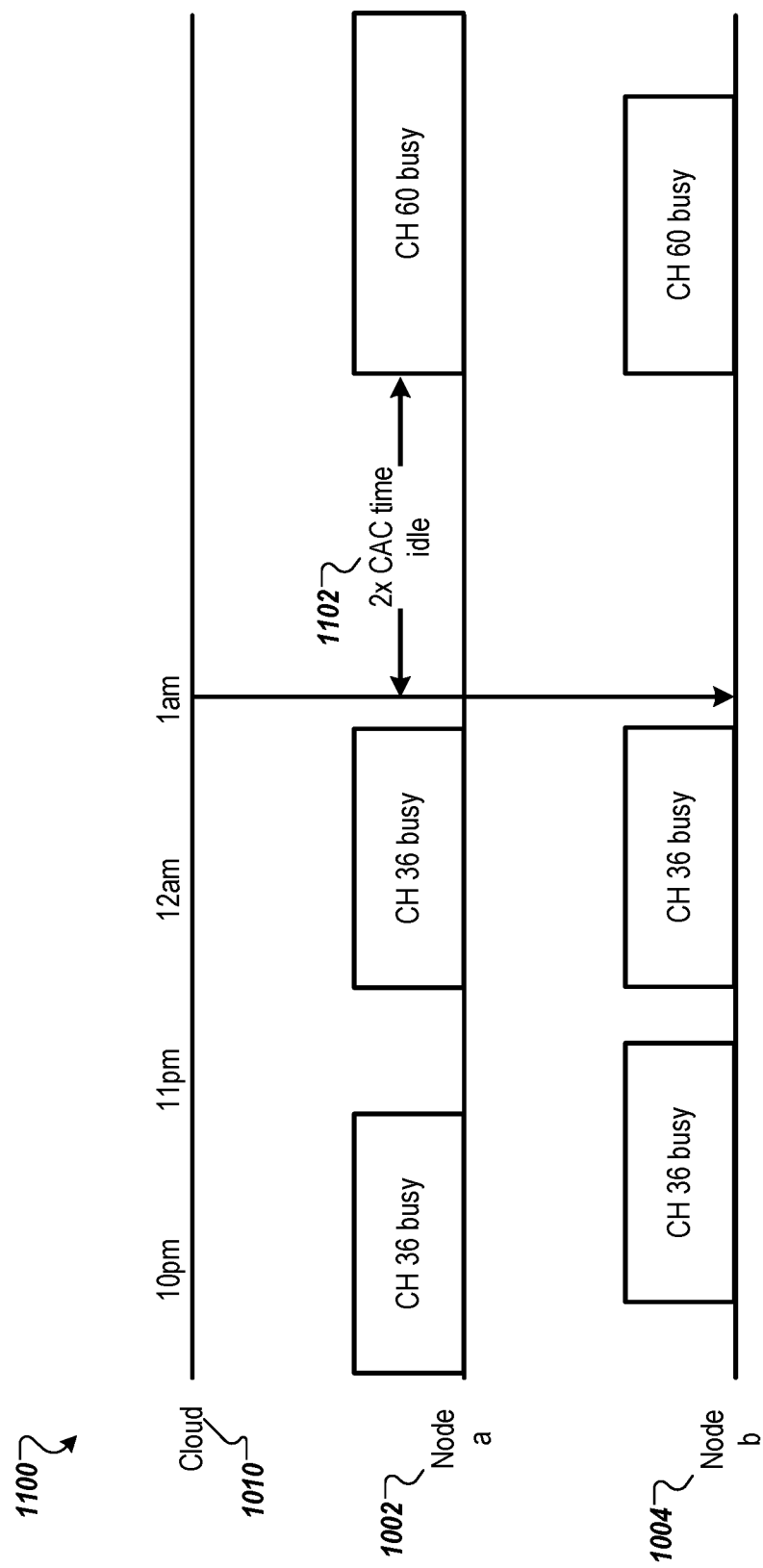
FIG. 11 is a timing diagram illustrating idle periods of a two mesh network device in which a channel recovery process can be schedule by a server according to one embodiment.

FIG. 11 is a timing diagram 1100 illustrating idle periods of a two mesh network device in which a channel recovery process can be schedule by a server according to one embodiment. As described above, the mesh network device can report historical data. The server 1010 can determine when the mesh network device 1002 and the mesh network device 1004 are historically busy and historically idle. The server 1010 can determine a 2×CAC time period 1102 in which the mesh network devices are idle and can schedule a channel recovery process during this idle period to avoid service interruption.

Figure 12:
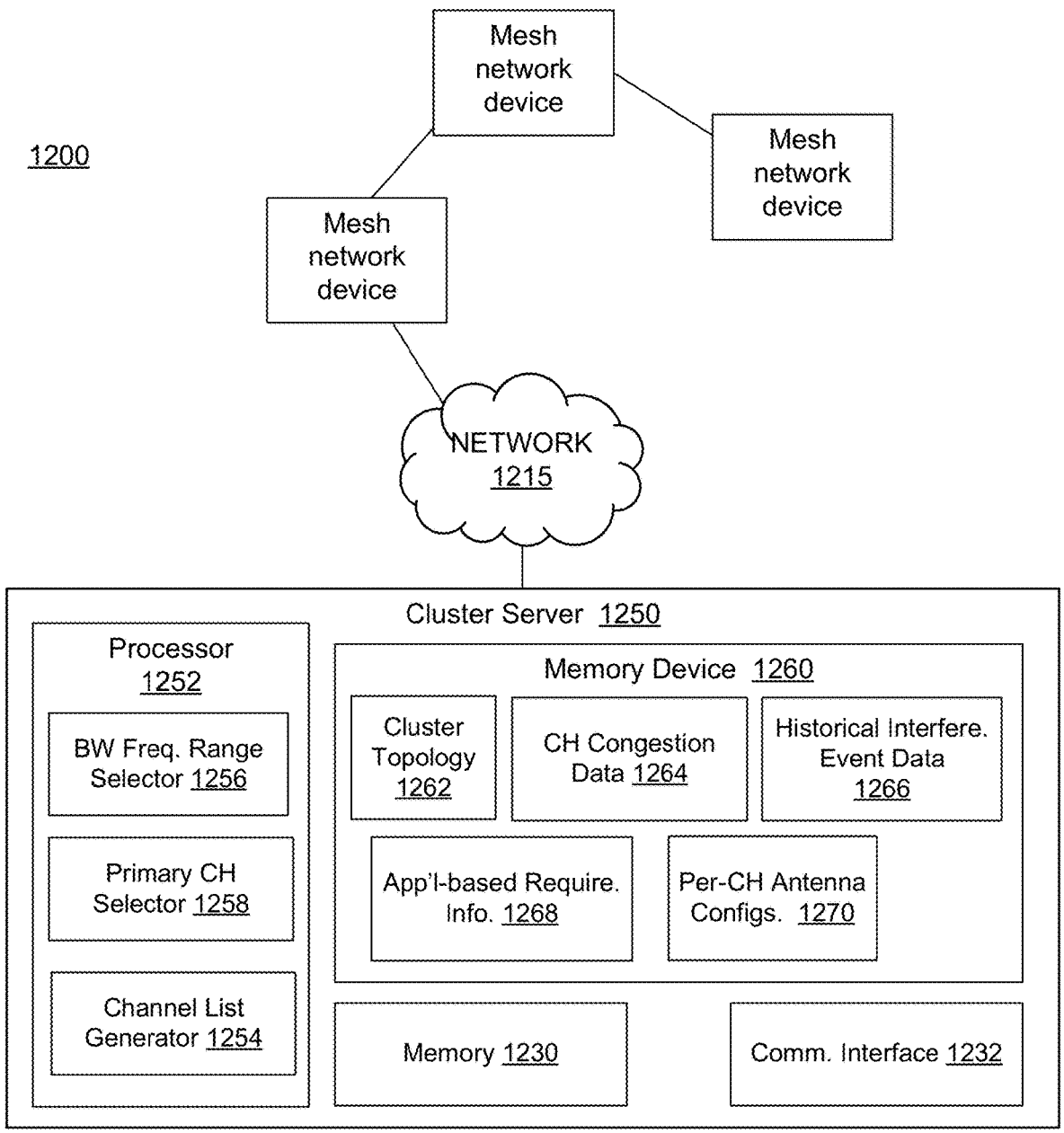
FIG. 12 is a block diagram of a cluster server for coordinated peer-assessment discovery and channel coordination for a DFS mesh network according to one embodiment.

FIG. 12 is a block diagram of a cluster server 1250 for coordinated peer-assessment discovery and channel coordination for a DFS mesh network 1200 according to one embodiment. The cluster server 250 can be a remote server, a cloud computing device such as a cloud server, or a cloud service implemented by one or more servers. The mesh network devices of the DFS mesh network 1200 can communicate with the cluster server 1250 via a network 1215. In various embodiments, the cluster server 1250 may include memory 1230, a communication interface 1232, a processor 1252, and a memory device 1260. The communication interface 1232, which may include one or more network devices for connecting to the Internet, may be adapted to also wirelessly couple the cluster server 1250 to the mesh network devices and to communicate data with the mesh network devices as described herein. The data received from the mesh network devices may include, for example, cluster topology information, such as node location, historical interference event data (e.g., which mesh network devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple mesh network devices communicate. The received data may further include information associated with, or useable to determine, pattern recognition and learning associated with radar event detection, data bandwidth requirements, and latency requirements, and the like.

In embodiments, the memory device 1260 includes data stored, which are related to channels of the mesh network devices and associated with cluster topology information 1262 of the WMN, channel congestion data 1264, historical interference event data 1266, historical application-based requirements information 1268 (e.g., historical application-based throughput and latency requirements), and per-channel antenna configurations 1269. The memory device can also store peer-assessment discovery channels to be used for the DFS channels, as well as fallback channels of the DFS channels. The network 215 may be representative of an Internet or WAN connection. Such an Internet or WAN connection may include additional links or trunks, whether wired or wireless, that may involve other types of wideband communication, including those based on cellular standard(s).

In various embodiments, the processor 1252 (e.g., processing device) includes a bandwidth frequency range selector 2156, which is to develop a bandwidth selection priority list for the various mesh network devices, a primary channel selector 1258, which is to develop a primary channel priority list for the various mesh network devices, and a channel list generator 1254, which is to help the mesh network device perform a coordinated and targeted discovery scan as described herein. The bandwidth frequency range selector 1256 may develop the bandwidth selection priority list based on the data stored in the memory device 1260, and particularly in coordinating bandwidth range priorities to coincide with channels that may have higher application service level requirements of throughput or lower application service level requirements for latency. In one example, therefore, widths of the communication link bandwidth may be prioritize to include channels that historically serve streaming media such as serving Echo® devices or AIV client devices. The priorities of the bandwidth ranges within the bandwidth selection priority list may also be set in a way that coordinates with preserving the highest prioritized primary channels within the primary channel priority list for adjacent (or nearby) mesh network devices.

Furthermore, the primary channel selector 1258 may develop the primary channel priority list based on the data stored in the memory device 1260, and particularly in view of the cluster topology information 1262, the channel congestion data 1264, and the historical interference event data 1266. Use of this information will allow the primary channel selector 1258 to prioritize channels as primary channels that have fewer numbers historical interference detections, that historically have less channel congestion, and/or that coincide with priorities developed for channels of an adjacent mesh network device.

The channel list generator 1254 can track mesh network devices of a particular mesh network device. The channel list generator 1254 can generate a channel list that identifies a subset of channels of neighbor mesh network devices to reduce discovery time and ensure reliable peering by a mesh network device. The server 1250 can send the neighbor channel list 524 (C_List), described above with respect to FIG. 5B, or the grouped neighbor channel list 542, described above with respect to FIG. 5C. The mesh network device can use the neighbor channel list 524 in connection with the targeted discovery scan 520, as described above with respect to FIG. 5B. The mesh network device can use the grouped neighbor channel list 542 in connection with the coordinated and targeted discovery scan 540, as described above with respect to FIG. 5C.

Figure 13:
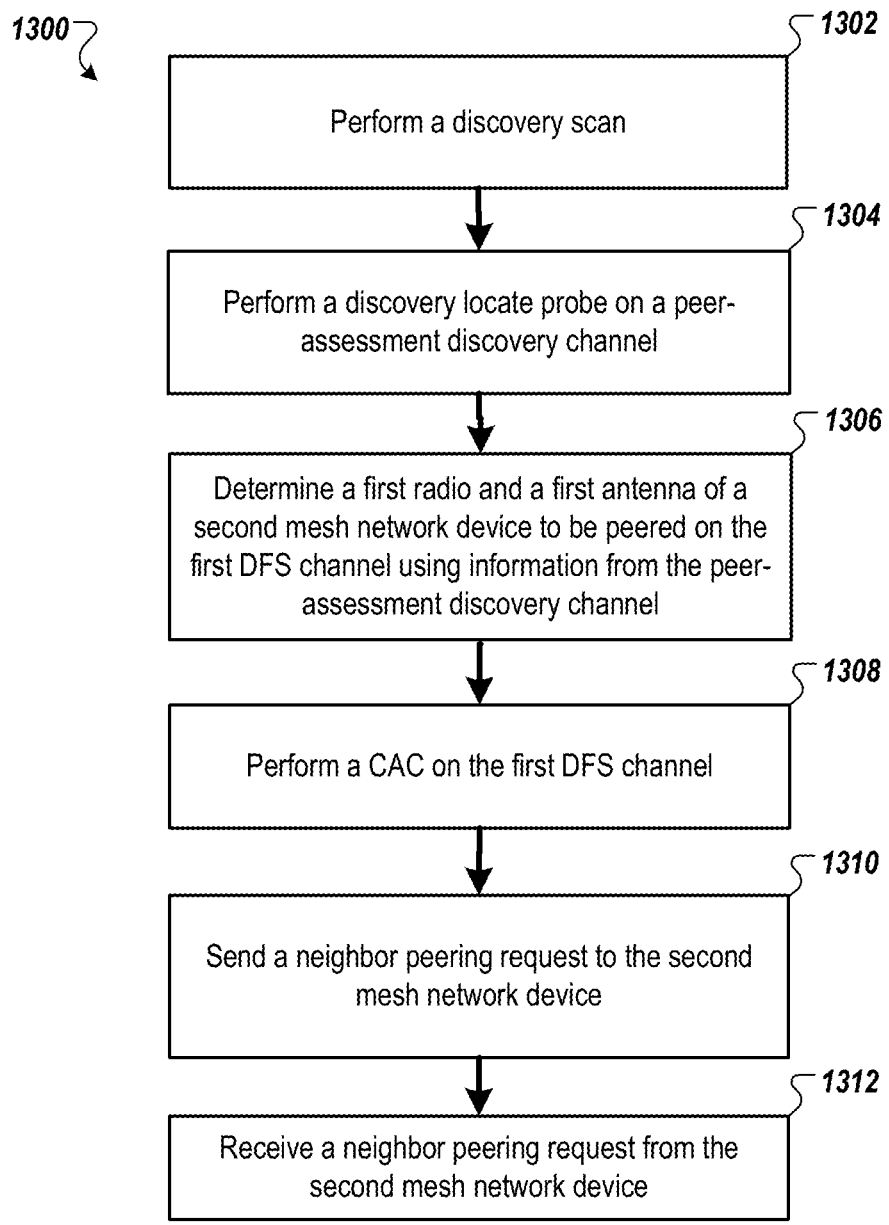
FIG. 13 is a flow diagram illustrating a method of operating a mesh network device in a three-stage discovery protocol according to one embodiment.

FIG. 13 is a flow diagram illustrating a method 1300 of operating a mesh network device in a three-stage discovery protocol according to one embodiment. The method 1300 may be performed by processing logic that comprises hardware (e.g., circuitry, dedicated logic, programmable logic, microcode, etc.), software, firmware, or a combination thereof. In one embodiment, method 1300 may be performed by any of the mesh network devices described herein and illustrated with respect to FIGS. 1-12.

Referring to FIG. 13, the method 1300 begins by the processing logic, in a first stage of the three-stage discovery protocol, performing a discovery scan using the first radio to find a set of neighbor devices in proximity to the mesh network device (block 1302). The processing logic, in a second stage of the three-stage discovery protocol, performs a discovery locate probe process on a peer-assessment discovery channel associated with a first DFS channel (block 1304). The peer-assessment discovery channel is a non-DFS channel that is selected from a same frequency band group as the first DFS channel to mimic signal propagation characteristics, attenuation factors, and output power of the first DFS channel. In the second stage, the processing logic determines a first radio and a first antenna of a second mesh network device to be peered with the second radio on the first DFS channel (block 1306). The first radio and the first antenna can be determined using information obtained from the discovery locate probe process on the peer-assessment discovery channel at block 1304 and 1306. The first radio and the first antenna can be considered a radio-antenna sector. This can be done for each of the set of neighbors found in the discovery scan at block 1302. The radio-antenna sector for each neighbor mesh network devices can be optimized.

After the second stage, the processing logic can perform a peering process in which the processing logic, in a third stage of the three-stage discovery protocol, performs a Channel Available Check (CAC) on the first DFS channel (block 1308). The processing logic, after the CAC at block 1308, sends a neighbor peering request to the second mesh network device via the second radio (block 1310) and receives a neighbor peering response from the second mesh network device via the second radio (block 1312). The neighbor peering response confirms establishment of a communication channel between the second radio of the mesh network device and the first radio of the second mesh network device. The operations 1304 through 1312 can be repeated for other DFS channels.

In a further embodiment, the processing logic, at block 1306, determines a first radio and a first antenna of a third mesh network device to be peered with the third radio on a second DFS channel. In the third stage, the processing logic performs a second CAC on the second DFS channel. The processing logic, after the second CAC, sends a second neighbor peering request to the third mesh network device via the third radio and receives a second neighbor peering response from the third mesh network device via the third radio. The second neighbor peering response confirms establishment of a second communication channel between the first radio of the mesh network device and the second radio of the third mesh network device over the second DFS channel. In some embodiments, the second DFS channel is in a different frequency band group than the first DFS channel. In some embodiments, the second DFS channel is in the same frequency band group as the first DFS channel. In other embodiments, the processing logic, at block 1306, determines a first radio and a first radio of a fourth mesh network device to be peered with a fourth radio on a third DFS channel. Similarly, the processing logic can determine radios and antennas of other mesh network device to which radios of the first mesh network device can peer. For each of the radios to be peered, the processing logic can use a peer-assessment discovery channel to mimic the DFS channel to be used for the peering.

In one embodiment, the processing logic, at block 1302, performs an uncoordinated discovery scan where all channels are scanned. In another embodiment, the processing logic performs a targeted discovery scan or a coordinated and targeted discovery scan at block 1302. In particular, the processing logic can receive, from a server, a neighbor channel list before performing the discovery scan. The neighbor channel list identifies a subset of channels of the set of neighbor devices in proximity to the mesh network device. The neighbor channel list limits the discovery scan to the subset of channels as a targeted discovery scan. The processing logic performs the targeted discovery scan in the first stage at block 1302 using the first radio to find the subset of channels of the set of neighbor devices in proximity to the mesh network device. In another embodiment, the processing logic receives, from a server, a grouped neighbor channel list before performing the discovery scan. The grouped neighbor channel list identifies a subset of channels of the set of neighbor devices that are clustered by the server in a group and in proximity to the mesh network device. The grouped neighbor channel list limits the discovery scan to the subset of channels as a coordinated and targeted discovery scan. The processing logic performs the coordinated and targeted discovery scan in the first stage at block 1302 using the first radio to find the subset of channels of the set of neighbor devices that are clustered by the server in the group and in proximity to the mesh network device. In other embodiments, the processing logic receives a neighbor channel list and node clustering information. The processing logic can use the node clustering information to further limit the neighbor channel list appropriately. That is, the processing logic can generate a grouped neighbor channel list based on information provided by the server.

Figure 14:
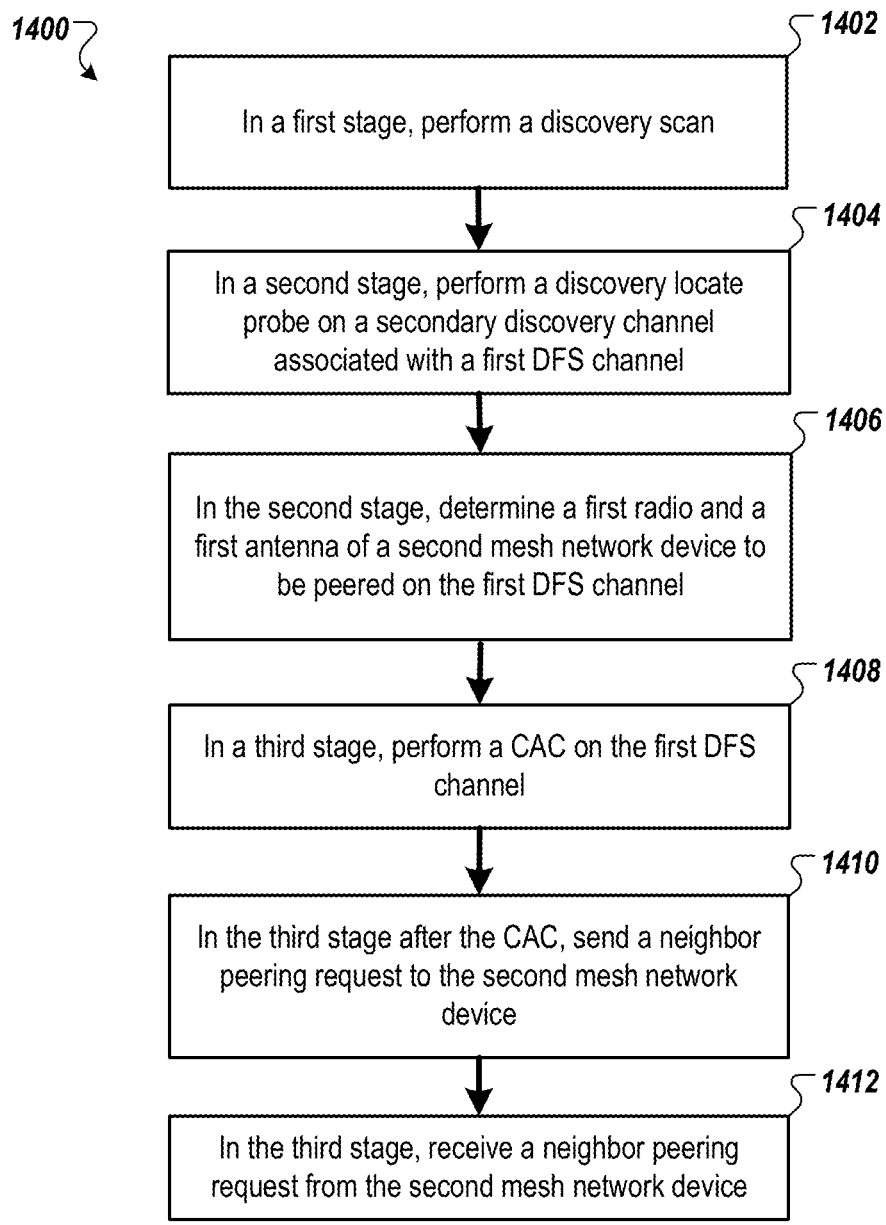
FIG. 14 is a flow diagram illustrating a method of operating a mesh network device in a three-stage discovery protocol according to another embodiment.

FIG. 14 is a flow diagram illustrating a method 1400 of operating a mesh network device in a three-stage discovery protocol according to another embodiment. The method 1400 may be performed by processing logic that comprises hardware (e.g., circuitry, dedicated logic, programmable logic, microcode, etc.), software, firmware, or a combination thereof. In one embodiment, method 1400 may be performed by any of the mesh network devices described herein and illustrated with respect to FIGS. 1-12.

Referring to FIG. 14, the method 1400 begins by the processing logic, in a first stage of a three-stage discovery protocol, performing a discovery scan using a first radio of a first mesh network device to find a set of neighbor devices in proximity to the first mesh network device (block 1402). In a second stage of the three-stage discovery protocol, the processing logic performs a discovery locate probe process on a secondary discovery channel associated with a first DFS channel. The secondary discovery channel is a non-DFS channel that is selected from a same frequency band group as the first DFS channel. In the second stage, the processing logic determines a first radio and a first antenna of a second mesh network device for peering the first mesh network device and the second mesh network device over the first DFS channel (block 1406). In a third stage of the three-stage discovery protocol, the processing logic performs a CAC on the first DFS channel (block 1408). In the third stage after the CAC, the processing logic sends a neighbor peering request to the second mesh network device via a second radio of the first mesh network device (block 1410). The processing logic receives a neighbor peering response from the second mesh network device via the second radio (block 1412). The neighbor peering response confirms establishment of a first communication channel between the second radio of the first mesh network device and the first radio of the second mesh network device over the first DFS channel.

In a further embodiment, the processing logic, in the second stage, performs a second discovery locate probe process on a second secondary discovery channel associated with a second DFS channel. The second secondary discovery channel is a non-DFS channel that is selected from a same frequency band group as the second DFS channel. In the second stage, the processing logic determines a first radio and a first antenna of a third mesh network device for peering the first mesh network device and the third mesh network device over the second DFS channel. In the third stage, the processing logic performs a second CAC on the second DFS channel. In the third stage after the second CAC, the processing logic sends a second neighbor peering request to the third mesh network device via a third radio of the first mesh network device and receives a second neighbor peering response from the third mesh network device via the third radio. The second neighbor peering response confirms establishment of a second communication channel between the third radio of the first mesh network device and the first radio of the third mesh network device over the second DFS channel.

In a further embodiment, the second DFS channel is in a different frequency band group than the first DFS channel. Alternatively, the second DFS channel and the first DFS channel are in a same frequency band group.

In another embodiment, the processing logic receives, from a server, a neighbor channel list before performing the discovery scan. The neighbor channel list identifies a subset of channels of the set of neighbor devices in proximity to the first mesh network device and limits the discovery scan to the subset of channels as a targeted discovery scan. The processing logic performs the targeted discovery scan in the first stage using the first radio to find the subset of channels of the set of neighbor devices in proximity to the first mesh network device.

In another embodiment, the processing logic receives, from a server, a grouped neighbor channel list before performing the discovery scan. The grouped neighbor channel list identifies a subset of channels of the set of neighbor devices that are clustered by the server in a group and in proximity to the first mesh network device and limits the discovery scan to the subset of channels as a coordinated and targeted discovery scan. The processing logic performs the coordinated and targeted discovery scan in the first stage using the first radio to find the subset of channels of the set of neighbor devices that are clustered by the server in the group and in proximity to the first mesh network device.

In another embodiment, the processing logic performs the discovery scan at block 1402 by performing the following: i) receiving, via the first radio, a 2.4 GHz beacon frame from the second mesh network device, the 2.4 GHz beacon frame including a first informational element identifying the second mesh network device as an available access point in a wireless mesh network (WMN); ii) listening, for a defined time period, on a first channel of the second radio, a first channel of the third radio, a first channel of the fourth radio, and a first channel of the fifth radio; iii) repeating step ii) on a second channel, a third channel, and a fourth channel for each of the second radio, the third radio, the fourth radio, and the fifth radio; and iv) in response to steps ii) and iii), receiving, via the second radio, a 5 GHz mesh frame from the second mesh network device, the 5 GHz mesh frame including an identifier (ID) of the second mesh network device; and v) comparing the first informational element to the ID to determine a sector identifier that identifies a first antenna from which the 5 GHz mesh frame was transmitted, a first signal strength indicator (RSSI) value corresponding to the 5 GHz mesh frame, an unused radio and an unused channel of the second mesh network device. The unused radio and the unused channel are not currently utilized by the second mesh network device.

In another embodiment, the processing logic performs the discovery locate probe process on the secondary discovery channel associated with a first DFS channel at block 1402 by vi) sending a discovery request frame to the unused radio of the second mesh network device on the secondary discovery channel via each of the second radio, the third radio, the fourth radio, and the fifth radio; vii) receiving a locate probe request from the second mesh network device on the secondary discovery channel, in response to the discovery request frame, via at least one of the first radio, the second radio, the third radio, or the fourth radio, the locate probe request including a source sector identifier that identifies a second antenna from which the locate probe request is transmitted; and viii) determining a second signal strength indicator value corresponding to the locate probe request. The signal strength indicators can be used in connection with determining which radio and which antennas to use for peering. In one embodiment, during ii) and vi), the processing logic can selectively couple the second radio to the first one of a plurality of directional antennas, selectively couple the third radio to the second one of the plurality of directional antennas, selectively couple the fourth radio to the third one of the plurality of directional antennas, and selectively couple the fifth radio to the fourth one of the plurality of directional antennas.

In a further embodiment, the processing logic further performs the following. ix) updating a radio configuration table associated with the first mesh network device to include the second signal strength indicator value; and x) repeating steps vi) through viii) on a second secondary discovery channel, wherein the second secondary discovery channel is different than the secondary discovery channel.

In one embodiment, the neighbor peering request includes the following: (1) a source sector identifier that identifies a source antenna at the mesh network device to exchange data with the second mesh network device; (2) a destination sector identifier at the second mesh network device to exchange the data with the mesh network device; (3) a channel identifier that identifies which of the first channel, the second channel, the third channel, or the fourth channel to exchange the data between the mesh network device and the second mesh network device; and (4) a media access control (MAC) address of the second radio, and a radio configuration table for the mesh network device. Alternatively, the neighbor peering request can include more or less information for peering the two devices over the DFS channel.

In another embodiment, the processing logic sends a second neighbor peering request to the third mesh network device via a third radio of the first mesh network device and receives a second neighbor peering response from the third mesh network device via the third radio. The second neighbor peering response confirms establishment of a second communication channel between the third radio of the first mesh network device and the first radio of the third mesh network device over a second DFS channel. The processing logic can also send a third neighbor peering request to the fourth mesh network device via a fourth radio of the first mesh network device and receive a third neighbor peering response from the fourth mesh network device via the fourth radio. The third neighbor peering response confirms establishment of a third communication channel between the fourth radio of the first mesh network device and the first radio of the fourth mesh network device over a third DFS channel.

Figure 15:
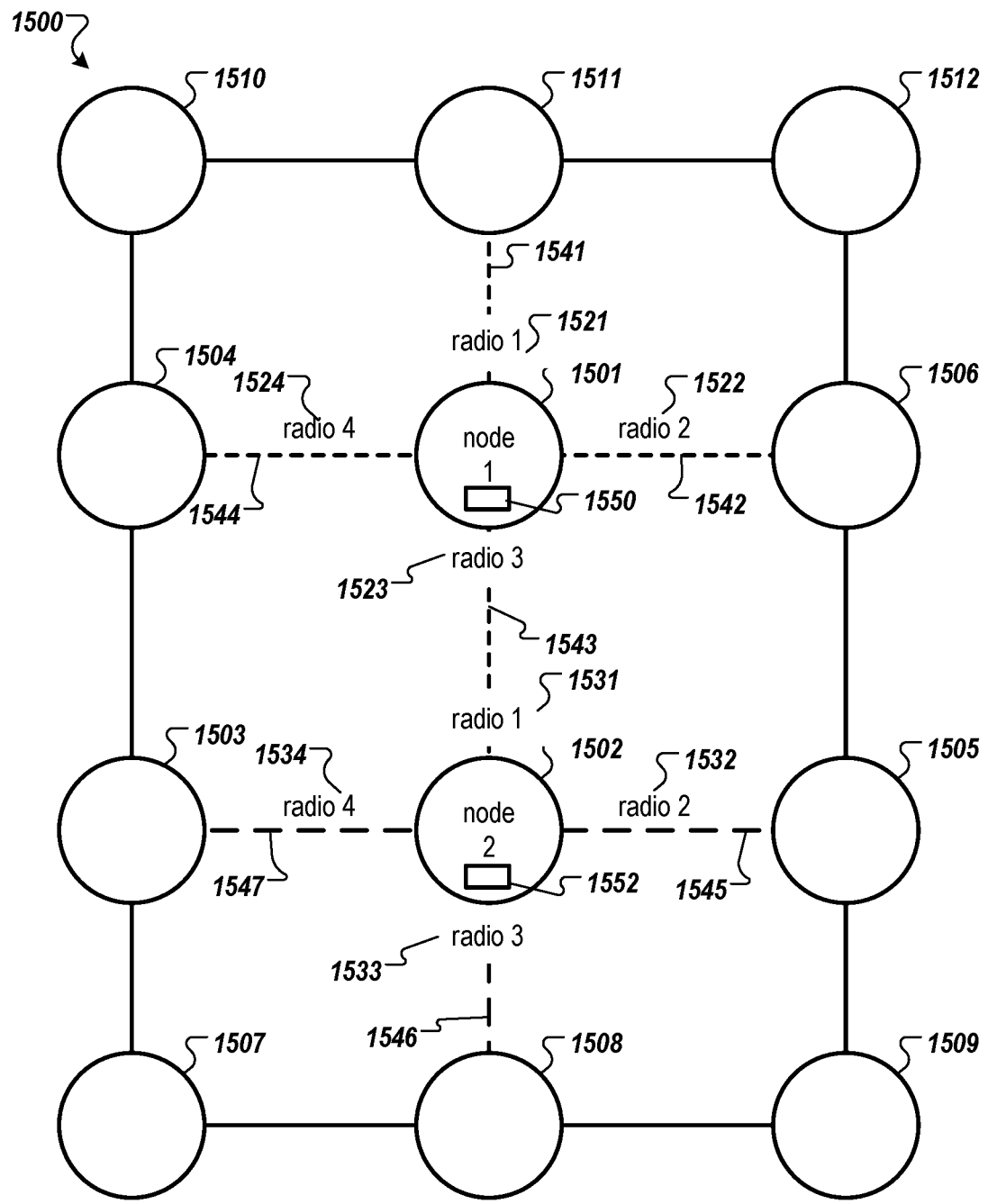
FIG. 15 is a diagram of a WMN with twelve network hardware devices, each having logic for neighbor discovery and channel coordination for DFS and four radios to form a network backbone of peer-to-peer (P2P) wireless connections according to one embodiment.

Once the neighbor discovery process and the neighbor selection process are completed, the mesh network devices can form a network backbone of the WMN by peering mesh network devices on specific channels, where each mesh network device is communicatively coupled to one or more neighbor mesh network devices, such as illustrated and described with respect to FIG. 15.

FIG. 15 is a diagram of a WMN 1500 with twelve network hardware devices, each having logic (1550, 1552) for neighbor discovery and channel coordination for DFS and four radios to form a network backbone of peer-to-peer (P2P) wireless connections according to one embodiment. The WMN 1500 includes multiple network hardware devices 1501-1512, referred to as nodes 1501-1512 for ease of description. In other embodiments, the WMN 1500 may include more or less devices than twelve. The nodes 1501-1512 may be considered mesh routers that include four radios (e.g., four 5 GHz radios) for the network backbone for multiple connections with other mesh routers. For example, an eleventh node 1511 may be located to the north of the first node 1501 and connected over a first wireless connection 1541 (e.g., 5 GHz connection). The sixth node 1506 may be located to the east of the first node 1501 and connected over a second wireless connection 1542. The second node 1502 may be located to the south of the first node 1501 and connected over a third wireless connection 1543. The fourth node 1504 may be located to the west of the first node 1501 and connected over a fourth wireless connection 1544. In other embodiments, additional network hardware devices can be connected to other wireless connections of the first node 1501. Similarly, the second node 1502 can be connected to a third node 1503 over a wireless connection 1547, a fifth node 1505 over a wireless connection 1545, and an eighth node 1508 over a wireless connection 1546. It should also be noted that the nodes 1503-1512 may also connect to other nodes using its respective radios. It should also be noted that the locations of the nodes 1501-1512 can be in other locations than north, south, east, and west. For example, the nodes can be located above or below the first node 1501, such as on another floor of a building or house.

The first node 1501 includes a first radio 1521, a second radio 1522, a third radio 1523, and a fourth radio 1524. The first node 1501 may also include at least one radio to establish a wireless connection (e.g., 2.4 GHz) with one or more client consumption devices. The first node 1501 may operate as a mesh router that has four radios operating concurrently or simultaneously to transfer mesh network traffic, as well as a radio to service connected client consumption devices. This may require that the 5GLL and 5GLH to be operating simultaneously and the 5GHL and 5GHH to be operating simultaneously, as described in more detail below. The second node 1502 includes a first radio 1531, a second radio 1532, a third radio 1533, and a fourth radio 1534. The second node 1502 may also include at least one radio to establish a wireless connection (e.g., 2.4 GHz) with one or more client consumption devices. The second node 1502 may operate as a mesh router that has four radios operating concurrently or simultaneously to transfer mesh network traffic, as well as a radio to service connected client consumption devices.

For neighbor discovery and channel coordination for the first node 1501, the first node 1501 includes logic 1550. The logic 1550 may perform the operations described above with respect to FIGS. 1-14. Similarly, the second node 1502 includes logic 1552 for neighbor discovery and channel coordination as described herein.

In this embodiment, it is assumed that each mesh node has 4 radios and each radio may communicate with at most one neighbor node. A neighbor node is a node to which a node has established a wireless connection, such as a P2P wireless connection, without any intervening nodes between the node and the neighbor node. In this embodiment, the first node

1501 includes four neighbor nodes, including the eleventh node 1511 over the first wireless connection 1541, the sixth node 1506 over the wireless connection 1542, the second node 1502 over the third wireless connection 1543, and the fourth node 1504 over the fourth wireless connection 1544. In one embodiment, the WMN 1500 implements the IEEE 802.11s mesh implementation for defining how wireless devices can interconnect to create a WLAN mesh network. The 802.11 is a set of IEEE standards that govern wireless networking transmission methods. They are commonly used today in their 802.11a, 802.11b, 802.11g, and 802.11n versions to provide wireless connectivity in the home, office and some commercial establishments. The 802.11s is an IEEE 802.11 amendment for mesh networking.

It should be noted that although the depicted embodiment illustrates and describes twelve mesh nodes, in other embodiments, more than twelve mesh nodes may be used in the WMN 1500. It should be noted that FIG. 15 is a simplification of neighboring mesh network devices for a given mesh network device. The deployment of forty or more mesh network device may actually be located at various directions than simply north, south, east, and west as illustrated in FIG. 15. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 16:
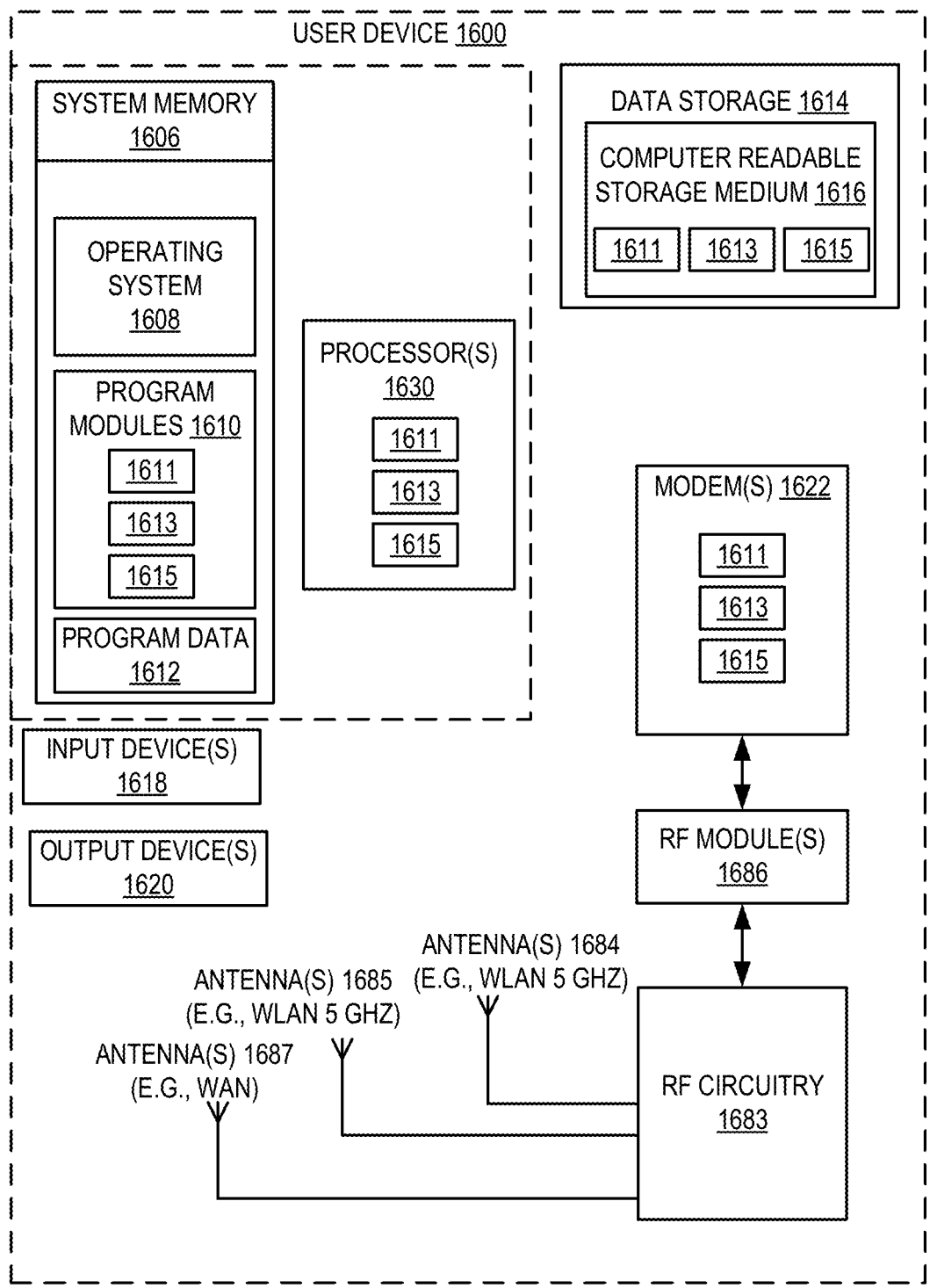
FIG. 16 is a block diagram of a network hardware device according to one embodiment.

FIG. 16 is a block diagram of a network hardware device 1600 according to one embodiment. The network hardware device 1600 may correspond to the mesh network devices described above with respect to FIGS. 1-15. Alternatively, the network hardware device 1600 may be other electronic devices, as described herein.

The network hardware device 1600 includes one or more processor(s) 1630, such as one or more CPUs, microcontrollers, field programmable gate arrays, or other types of processors. The network hardware device 1600 also includes system memory 1606, which may correspond to any combination of volatile and/or non-volatile storage mechanisms. The system memory 1606 stores information that provides operating system component 1608, various program modules 1610, program data 1612, and/or other components. In one embodiment, the system memory 1606 stores instructions of methods to control operation of the network hardware device 1600. The network hardware device 1600 performs functions by using the processor(s) 1630 to execute instructions provided by the system memory 1606. In one embodiment, the program modules 1610 may include a neighbor discovery module 1611, a neighbor peering module 1613, and a re-peering module 1615. The neighbor discovery module 1611 may perform some of the operations of the neighbor discovery process described herein (e.g., methods 1300 of FIG. 13 and/or method 1400 of FIG. 14). The neighbor peering module 1613 may perform other operations of the neighbor discovery process described herein (e.g., methods 1300 of FIG. 13 and/or method 1400 of FIG. 14). The re-peering module 1615 may perform operations described above when a radar event occurs and the mesh network devices switch to the fallback channel as described herein. Alternatively, the modules 1611-1615 may be implemented in a single module or multiple modules.

The network hardware device 1600 also includes a data storage device 1614 that may be composed of one or more types of removable storage and/or one or more types of non-removable storage. The data storage device 1614 includes a computer-readable storage medium 1616 on which is stored one or more sets of instructions embodying any of the methodologies or functions described herein. Instructions for the program modules 1610 (e.g., 1611, 1613, 1615) may reside, completely or at least partially, within the computer-readable storage medium 1616, system memory 1606 and/or within the processor(s) 1630 during execution thereof by the network hardware device 1600, the system memory 1606 and the processor(s) 1630 also constituting computer-readable media. The network hardware device 1600 may also include one or more input devices 1618 (keyboard, mouse device, specialized selection keys, etc.) and one or more output devices 1620 (displays, printers, audio output mechanisms, etc.).

The network hardware device 1600 further includes a modem 1622 to allow the network hardware device 1600 to communicate via a wireless connections (e.g., such as provided by the wireless communication system) with other computing devices, such as remote computers, an item providing system, and so forth. The modem 1622 can be connected to one or more RF modules 1686. The RF modules 1686 may be a WLAN module, a WAN module, PAN module, GPS module, or the like. The antenna structures (antenna(s) 1684, 1685, 1687) are coupled to the RF circuitry 1683, which is coupled to the modem 1622. The RF circuitry 1683 may include radio front-end circuitry, antenna switching circuitry, impedance matching circuitry, or the like. The antennas 1684 may be GPS antennas, NFC antennas, other WAN antennas, WLAN or PAN antennas, or the like. The modem 1622 allows the network hardware device 1600 to handle both voice and non-voice communications (such as communications for text messages, multimedia messages, media downloads, web browsing, etc.) with a wireless communication system. The modem 1622 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1622 may generate signals and send these signals to antenna(s) 1684 of a first type (e.g., WLAN 5 GHz), antenna(s) 1685 of a second type (e.g., WLAN 2.4 GHz), and/or antenna(s) 1687 of a third type (e.g., WAN), via RF circuitry 1683, and RF module(s) 1686 as descried herein. Antennas 1684, 1685, 1687 may be configured to transmit in different frequency bands and/or using different wireless communication protocols. The antennas 1684, 1685, 1687 may be directional, omnidirectional, or non-directional antennas. In addition to sending data, antennas 1684, 1685, 1687 may also receive data, which is sent to appropriate RF modules connected to the antennas. One of the antennas 1684, 1685, 1687 may be any combination of the antenna structures described herein.

In one embodiment, the network hardware device 1600 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1622 is shown to control transmission and reception via antenna (1684, 1685, 1687), the network hardware device 1600 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A mesh network device comprising:
a first radio coupled to an omnidirectional antenna;
a second radio selectively coupled to any one of a plurality of directional antennas; and
an application processor coupled to the first radio and the second radio, wherein the application processor is to perform neighbor discovery and channel coordination of a dynamic frequency selection (DFS) mesh network, wherein the application processor:
performs a discovery scan using the first radio and finds a set of neighbor devices in physical proximity to the mesh network device;
notifies the set of neighbor devices using the first radio, to start a discovery process on a first peer-assessment discovery channel associated with a first DFS channel of the second radio, wherein the first peer-assessment discovery channel is a non-DFS channel that has a same frequency band group as the first DFS channel and mimics signal propagation characteristics, attenuation factors, and output power of the first DFS channel;
performs the discovery process on the first peer-assessment discovery channel by sending a first probe request via the first peer-assessment discovery channel to a first radio of a second mesh network device in the set of neighbor devices and sending a second probe request via the first peer-assessment discovery channel to a second radio of the second mesh network device;
determines, using information obtained from the discovery process on the first peer-assessment discovery channel, the first radio of the second mesh network device to be peered with the second radio via the first DFS channel;
performs a Channel Available Check (CAC) via the first DFS channel;

sends a neighbor peering request to the second mesh network device via the second radio, the neighbor peering request comprising data that is used to establish a communication channel between the second radio of the mesh network device and the first radio of the second mesh network device; and receives a neighbor peering response from the second mesh network device via the second radio, the neighbor peering response comprising data that confirms establishment of the communication channel between the second radio of the mesh network device and the first radio of the second mesh network device.

2. The mesh network device of claim 1, further comprising:

a third radio selectively coupled to any one of the plurality of directional antennas, wherein the application processor further:

performs a discovery process on a second peer-assessment discovery channel associated with a second DFS channel of the third radio and determines a first radio of a third mesh network device to be peered with the third radio via the second DFS channel;

performs a second CAC via the second DFS channel;

sends a second neighbor peering request to the third mesh network device via the third radio, the second neighbor peering request comprising second data that is used to establish a second communication channel between the first radio of the mesh network device and the second radio of the third mesh network device over the second DFS channel; and receives a second neighbor peering response from the third mesh network device via the third radio, the second neighbor peering response comprising second data that confirms establishment of the second communication channel between the first radio of the mesh network device and the second radio of the third mesh network device over the second DFS channel, wherein the second DFS channel is in a different frequency band group than the first DFS channel.

3. The mesh network device of claim 1, wherein the application processor further:

receives, from a server, a neighbor channel list before performing the discovery scan, wherein the neighbor channel list identifies a subset of channels that is less than all channels for communicating with the set of neighbor devices in physical proximity to the mesh network device, wherein the application processor limits the discovery scan to the subset of channels in the neighbor channel list.

4. The mesh network device of claim 1, wherein the application processor further:

receives, from a server, a grouped neighbor channel list before performing the discovery scan, wherein the grouped neighbor channel list identifies a subset of channels that is less than all channels for communicating with a group of the set of neighbor devices, the group of the set of neighbor devices being clustered by the server and in physical proximity to the mesh network device, wherein the application processor limits the discovery scan to the subset of channels in the grouped neighbor channel list.

5. A method comprising:

performing, by a first mesh network device, a first scan using a first radio wherein the first scan finds a set of neighbor devices in proximity to the first mesh network device;

notifying, by the first mesh network device using the first radio, the set of neighbor devices to start a discovery process on a first secondary channel associated with a first Dynamic Frequency Selection (DFS) channel, wherein the discovery process identifies a first radio of a second mesh network device, wherein the first secondary channel is a non-DFS channel that is selected from a same frequency band group as the first DFS channel performing, by the first mesh network device, the discovery process on the first secondary channel;

performing, by the first mesh network device, a Channel Available Check (CAC) via the first DFS channel; and sending, by the first mesh network device, a first request to the second mesh network device via a second radio of the first mesh network device, the first request comprising first data that establishes a first communication channel between the second radio of the first mesh network device and the first radio of the second mesh network device over the first DFS channel.

6. The method of claim 5, further comprising:

receiving, by the first mesh network device, a first response from the second mesh network device via the second radio, the first response comprises second data that confirms establishment of the first communication channel;

performing, by the first mesh network device, a second discovery process on a second secondary channel associated with a second DFS channel, wherein the second discovery process identifies a first radio of a third mesh network device, wherein the second secondary channel is a second non-DFS channel that is selected from a same frequency band group as the second DFS channel;

performing, by the first mesh network device, a second CAC via the second DFS channel;

sending, by the first mesh network device, a second request to the third mesh network device via a third radio of the first mesh network device, the second request comprising third data that establishes a second communication channel between the third radio of the first mesh network device and the first radio of the third mesh network device over the second DFS channel; and receiving, by the first mesh network device, a second response from the third mesh network device via the third radio, the second response comprising fourth data that confirms establishment of the second communication channel.

7. The method of claim 6, wherein the second DFS channel is in a different frequency band group than the first DFS channel.

8. The method of claim 5, further comprising:

receiving, from a server, a neighbor channel list before performing the first scan, wherein the neighbor channel list identifies a subset of channels that is less than all channels for communicating with the set of neighbor devices in proximity to the first mesh network device, wherein the first mesh network device limits the first scan to the subset of channels in the neighbor channel list.

9. The method of claim 5, wherein the first mesh network device further:
receiving, from a server, a channel list before performing the first scan, wherein the channel list identifies a subset of channels that is less than all channels for communicating with a group of the set of neighbor devices that are in proximity to the first mesh network device, wherein the first mesh network device limits the first scan to the subset of channels in the channel list.

10. The method of claim 5, wherein performing the first scan comprises:
i) receiving, via the first radio, a 2.4 GHz beacon frame from the second mesh network device, the 2.4 GHz beacon frame including a first informational element identifying the second mesh network device as an access point in a wireless mesh network (WMN);
ii) listening, for a defined time period, on a first channel of the second radio;
iii) repeating step ii) on a second channel, of the second radio;
iv) in response to steps ii) and iii), receiving, via the second radio, a 5 GHz mesh frame from the second mesh network device, the 5 GHz mesh frame including an identifier (ID) of the second mesh network device; and
v) determining a sector identifier that identifies a first antenna from which the 5 GHz mesh frame was transmitted, a first signal strength indicator (RSSI) value corresponding to the 5 GHz mesh frame, an unused radio of the second mesh network device and an unused channel of the unused radio.

11. The method of claim 10, wherein performing the discovery process via the first secondary channel associated with the first DFS channel comprises:
vi) sending a second request to the unused radio of the second mesh network device via the first secondary channel via the second radio;
vii) receiving a third request from the second mesh network device via the first secondary channel, in response to the second request, via the first radio, the third request including third data that identifies a second antenna from which the third request is transmitted;
viii) determining and storing a second signal strength indicator value corresponding to the third request; and
ix) repeating steps vi) through viii) on a second secondary channel, wherein the second secondary channel is different than the first secondary channel.

12. The method of claim 5, wherein the first request comprises:
(1) third data that identifies a source antenna at the first mesh network device;
(2) fourth data that identifies a destination antenna at the second mesh network device;
(3) fifth data that identifies the first communication channel between the first mesh network device and the second mesh network device; and
(4) a media access control (MAC) address of the second radio, and a radio configuration table for the first mesh network device, the radio configuration table comprising data that identifies assigned radios and assigned antennas of the first mesh network device.

13. The method of claim 5, further comprising:
sending, by the first mesh network device, a second request to a third mesh network device via a third radio of the first mesh network device, the second request comprising third data that establishes a second communication channel between the third radio of the first mesh network device and the first radio of the third mesh network device over a non-DFS channel; and
receiving, by the first mesh network device, a second response from the third mesh network device via the third radio, the second response comprising fourth data that confirms establishment of the second communication channel.

14. A dynamic frequency selection (DFS) mesh network comprising:
a first mesh network device; and
a second mesh network device, wherein the first mesh network device comprises a processor to:
perform a first scan using a first radio of a first mesh network device, wherein the first scan finds a set of neighbor devices in proximity to the first mesh network device;
notifies the set of neighbor devices using the first radio, to start a discovery process on a secondary channel associated with a first DFS channel, wherein the secondary channel is a non-DFS channel that is selected from a same frequency band group as the first DFS channel, wherein the discovery process identifies a first radio of the second mesh network device;
perform the discovery process on the secondary channel;
perform a Channel Available Check (CAC) via the first DFS channel; and
send a first request to the second mesh network device via a second radio of the first mesh network device, the first request comprises first data that establishes a first communication channel between the second radio of the first mesh network device and the first radio of the second mesh network device over the first DFS channel.

15. The DFS mesh network of claim 14, wherein the processor is further to:
receive a first response from the second mesh network device via the second radio, the first response comprising second data that confirms establishment of the first communication channel;
perform a second discovery process on a second secondary channel associated with a second DFS channel, wherein the second secondary channel is a non-DFS channel that is selected from a same frequency band group as the second DFS channel, wherein the second discovery process identifies a first radio of a third mesh network device;
performing a second CAC via the second DFS channel;
sending a second request to the third mesh network device via a third radio of the first mesh network device, the second request comprising third data that establishes a second communication channel between the third radio of the first mesh network device and the first radio of the third mesh network device over the second DFS channel; and
receiving a second response from the third mesh network device via the third radio, the second response comprises fourth data that confirms establishment of the second communication channel.

16. The DFS mesh network of claim 15, wherein the second DFS channel is in a different frequency band group than the first DFS channel.

17. The DFS mesh network of claim 14, wherein the processor is further to:

receive, from a server, a neighbor channel list before performing the first scan, wherein the neighbor channel list identifies a subset of channels of the set of neighbor devices in proximity to the first mesh network device, wherein the first mesh network device limits the first scan to the subset of channels.

18. The DFS mesh network of claim 14, wherein the processor is further to:
receive, from a server, a channel list before performing the first scan, wherein the channel list identifies a subset of channels of the set of neighbor devices that are in proximity to the first mesh network device, wherein the first mesh network device limits the first scan to the subset of channels.

19. The DFS mesh network of claim 14, further comprising a third mesh network device, and wherein the processor is further to:
determine a first radio of the third mesh network device;
perform a second CAC on a second DFS channel;
send a second request to the third mesh network device via a third radio of the first mesh network device, the second request comprising third data that establishes a second communication channel between the third radio of the first mesh network device and the second radio of the third mesh network device over the second DFS channel; and
receive a second response from the third mesh network device via the third radio, the second response comprising fourth data that confirms establishment of the second communication channel, wherein the second DFS channel is in a different frequency band group than the first DFS channel.

20. The DFS mesh network of claim 14, further comprising a third mesh network device, and wherein the processor is further to:
send a second request to the third mesh network device via a third radio of the first mesh network device, the second request comprising third data that establishes a second communication channel between the third radio of the first mesh network device and the first radio of the third mesh network device over a non-DFS channel; and
receive a second response from the third mesh network device via the third radio, the second response comprising fourth data that confirms establishment of the second communication channel.

* * * * *